United States Patent
Dagman

(10) Patent No.: US 7,934,239 B1
(45) Date of Patent: Apr. 26, 2011

(54) METHOD AND SYSTEM TO DAISY-CHAIN ACCESS TO VIDEO RESOURCES

(75) Inventor: Vadim Dagman, Foster City, CA (US)

(73) Assignee: Monsoon Multimedia, San Mateo, CA (US)

(*) Notice: Subject to any disclaimer, the term of this patent is extended or adjusted under 35 U.S.C. 154(b) by 280 days.

(21) Appl. No.: 12/271,142

(22) Filed: Nov. 14, 2008

(51) Int. Cl.
*H04N 7/173* (2006.01)
(52) U.S. Cl. ............... 725/86; 725/87; 725/88; 725/102
(58) Field of Classification Search .................. 725/86, 725/87, 109, 110, 113, 116, 134, 135
See application file for complete search history.

(56) References Cited

U.S. PATENT DOCUMENTS

2006/0068818 A1* 3/2006 Leitersdorf et al. .......... 455/466
2007/0266414 A1* 11/2007 Kahn et al. .................. 725/113

* cited by examiner

*Primary Examiner* — Kieu Oanh Bui

(74) *Attorney, Agent, or Firm* — Kevin Roe

(57) ABSTRACT

A method and system to control at least one video resource daisy-chain access system. A first embodiment is a method to operate a video resource daisy-chain access system. The method includes requesting from a coordinator access instructions to receive a broadcast stream from a broadcast source; connecting to the broadcast source, or one of the re-broadcasting clients already receiving the broadcast stream, as instructed by the coordinator; optionally registering with the coordinator as a potential re-broadcasting source for new clients; optionally accepting connection requests from new clients for re-broadcasting of the received broadcast stream; and playing back on the client the received broadcast stream. A second embodiment is a video resource daisy-chain access system. The system includes a coordinator; a broadcasting source having a communication link with the coordinator; a first client having a communication link with the coordinator and a communication link with the broadcasting source; and a second client having a communication link with the coordinator and a communication link with the first client. These embodiments can be applied in several wired and wireless communication applications, even combinations of wired and wireless technologies including, but not limited to, IEEE 802.16 wireless applications, and equivalent technologies.

19 Claims, 18 Drawing Sheets

METHOD AND SYSTEM TO DAISY-CHAIN ACCESS TO VIDEO RESOURCES

BACKGROUND OF THE INVENTION

1. Field of the Invention

This invention relates to a method and system to share access to video resources, and more particularly to methods and systems to enable daisy-chained sharing of video resources such as a broadcast stream.

2. Description of the Prior Art

Place-shifting devices and products deliver video from the point where it's received live (e.g., a TV, set-top-box, or an equivalent) or stored (e.g., a Digital Video Recorder, or an equivalent) to another location over a network (e.g., a Local Area Network (LAN), Internet, or an equivalent). Through place-shifting, the users gain access to the personal live or stored video content from a place where it is traditionally not available (outside the living room or outside the house).

The technology being used for place-shifting is predominantly peer-to-peer between the recipient of the video and the place-shifting device. The shortcoming of such an approach is that the bandwidth available for the video stream is limited by the uplink speed of the broadband connection at the place where the place-shifting device is installed. Since, in most of the cases it is a residence, the uplink speed is quite low. This uplink speed puts a practical limit on now many recipients can be connected to one place-shifting device at a time. Normally, to maintain reasonable video quality, only a single connection is feasible, where the recipient of the video stream is typically either the owner of the place-shifting device itself, or another person authorized by the owner.

With social networking becoming a big part of our lifestyle, especially among the younger generation, people are looking for more ways to share their experiences with their peers, especially if it can be done conveniently (e.g., on-line). Place-shifting could be one of the ways in which people could share their live TV experience, especially when it comes to televised sports. Imagine a group of sport fans spread around the world, who could tap into a live sports broadcast available to only one sports fan at the moment, by connecting to the place-shifting device installed in that sports fan's home, and watch that broadcast simultaneously on their computers over the Internet or on their cell phones, chatting, or video conferencing, or communicating in any way while watching. To enable that usage model, the place-shifting technology should be modified to allow for a one-to-many connection, where several recipients can stream from one place-shifting device simultaneously.

There can also be participants on the website that reside in different geographical areas (e.g., different cities, different states, different countries, and/or different continents), having access to different video resources possibly in different languages, that are not generally available to the participants located in other geographical areas. Examples of such video resources are live ground-based or satellite television broadcasts, television cable networks, personal video cameras or recorders, or equivalent video resources. With the advent of place-shifting video equipment that enables remote viewing of a person's own television through the Internet, it is possible to imagine that other people could also be interested in seeing what is available to be seen on another person's television, especially in other geographical locations.

There are solutions out there that enable that one-to-many connection scenario, but these solutions are very costly and hardly scalable. The solutions involve a powerful server with a very wide broadband pipe. The server would receive the stream from a place-shifting device or application and then re-broadcast it to multiple recipients. The problems with that approach include—

(1) A server has to be very powerful to manage many streams at once. As the number of users increases, more servers will need to be added to the pool to balance the load, and that increases the total access cost.

(2) There is also a cost to be paid per megabyte for the Internet traffic that carries video to the server from the place-shifting sources and out of the server to the recipients. This cost also increases with the number of users.

(3) There is also a legal concern from the content owners and operators who are very nervous about content "touching" a server somewhere in the cloud, where it can be potentially hijacked and then copied uncontrollably.

One problem is the need to organize a system and method for making available video resources of an originator for remote access by one or more co-viewers. Another problem is how to synchronize the playback of the video stream on all co-viewers so that they all watch the same video at any given moment as if they are all looking at the same screen. Yet another problem is how to organize the access of co-viewers to the video resources of an original broadcasting source, and how this remote viewing access could be made available on a practical and economically sustainable basis on the Internet, given the costs associated with using up the Internet bandwidth and other related costs.

In view of the foregoing, what is needed is a method and system to control the remote viewing of video resources of one person by another person. Various wired and wireless audio/video applications could contribute to such methods and systems.

SUMMARY OF THE INVENTION

The present invention can be implemented in numerous ways, such as by a method or a system. Two aspects of the invention are described below.

A first aspect of the invention is directed to a method to operate a video resource daisy-chain access system. The method includes requesting from a coordinator access information to receive a broadcast stream from a broadcast source; connecting to the broadcast source, or one of the clients already receiving the broadcast stream, as instructed by the coordinator; and playing back on the client the received broadcast stream.

A second aspect of the invention is directed to a video resource daisy-chain access system. The system includes a coordinator; a broadcasting source having a communication link with the coordinator; a first client having a communication link with the coordinator and a communication link with the broadcasting source; and a second client having a communication link with the coordinator and a communication link with the first client.

These and other objects and advantages of the invention will become apparent to those skilled in the art from the following detailed description of the invention and the accompanying drawings.

DETAILED DESCRIPTION OF THE PREFERRED EMBODIMENT

Figure 1:
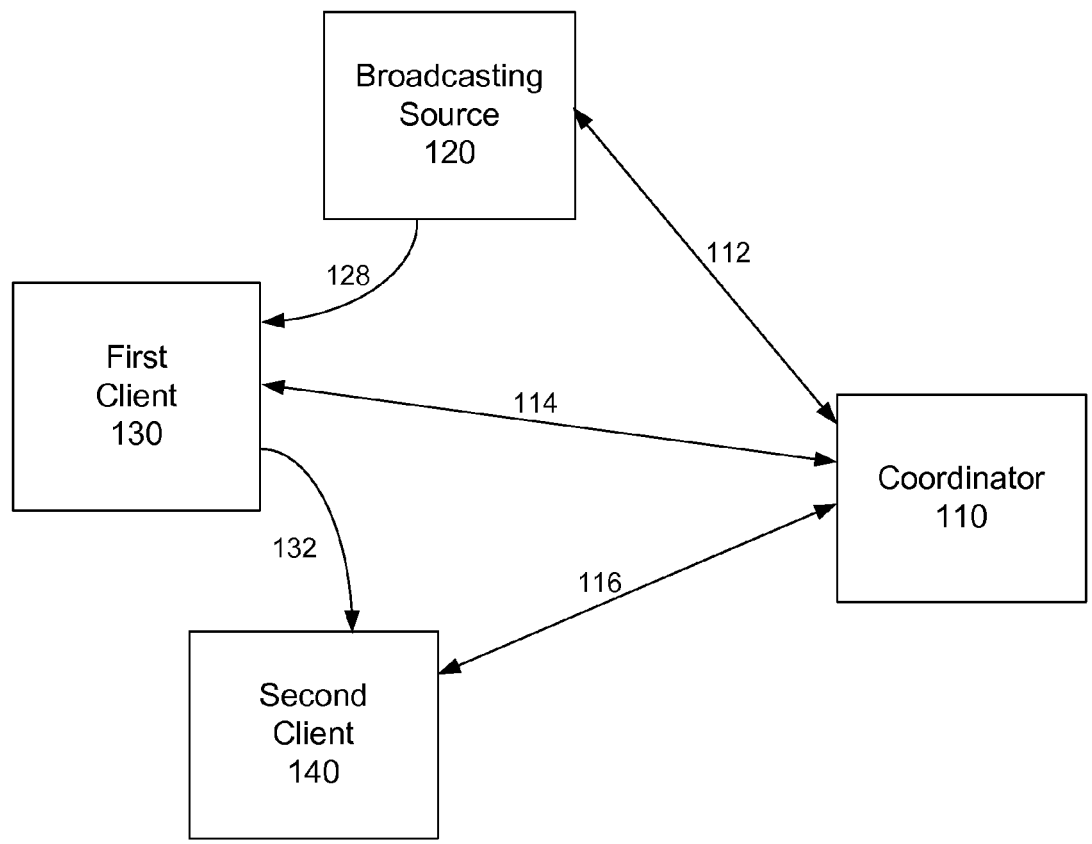
FIG. 1 illustrates a block diagram of a video resource daisy-chain access system, in accordance with one embodiment of the invention.

The invention provides a method and a system to operate a video resource daisy-chain access system, which could be used in either wired or wireless communication systems that provide audio and/or video information. Various embodiments of the invention can be applied to communication applications, biological applications, medical applications, electronic applications, teaching applications, and any other applications where such methods and systems can be beneficially used. In this specification, drawings, and claims, any instance of the term "wireless" or "radio-frequency" is defined as any electromagnetic signal frequency in the frequency range of 50,000 to 100,000,000,000 cycles per second (Hertz). However, the scope of the invention should not be considered to be limited only to communication systems in accordance to these technical specifications. Certain embodiments of the invention are also applicable to other data transmission technologies, using cable communications, optical fiber communications, and other wired and wireless communications.

The present invention includes various operations and/or modules, which will be described below. The operations of the present invention may be performed by hardware components or may be embodied in machine-executable instructions, which may be used to cause a general-purpose or special-purpose processor programmed with the instructions to perform the operations. In certain embodiments, the method may be performed by processing logic that may comprise hardware (e.g., dedicated logic, programmable logic, microcode, or an equivalent), software (such as instructions executed on a general purpose computer system, a dedicated machine, or an equivalent data processing system), or a combination of both hardware and software modules.

The present invention may be provided as a computer program product, or software, that may include a machine-readable medium having stored thereon instructions, which may be used to program a computer system (or other equivalent data processing systems or electronic devices) to perform a process according to the present invention. A machine-readable medium includes any mechanism for storing or transmitting information in a form (e.g., software, processing application) readable by a machine (e.g., a computer, or an equivalent data processing system or electronic device). The machine-readable medium may includes, but is not limited to, magnetic storage medium (e.g., floppy diskette); optical storage medium (e.g., CD-ROM, DVD, or an equivalent); magneto-optical storage medium; read only memory (ROM); random access memory (RAM); erasable programmable memory (e.g., EPROM, EEPROM, or an equivalent); flash memory; electrical, optical, acoustical or other form of propagated signal (e.g., carrier waves, infrared signals, digital signals, or an equivalent); or other type of medium suitable for storing electronic instructions. The present invention may also be practiced in distributed computing environments where the machine-readable medium is stored on and/or executed by more than one data processing system.

Audio/video recorders (henceforth for simplicity referred to below as video recorders) can be used in applications supporting remote access to audio/video devices and/or other devices. Such applications include controlling recording sessions and controlling transmissions to other devices. Such applications can involve audio and/or video transmissions over cable or other types of networks, or the transmission can be by wireless transmissions using various protocols (e.g., IEEE 802.16(g) for wireless radio-frequency networks, or an equivalent protocol).

FIG. 1 illustrates a block diagram of a video resource daisy-chain access system, in accordance with one embodiment of the invention. This system includes a coordinator 110, a broadcasting source 120, a first client 130, and a second client 140. The coordinator 110 has communication links 112, 114, and 116 with the broadcasting source 120, first client 130, second client 140, respectively. The broadcasting source 120 has a communication link 128 with the first client 130, which also has a communication link 132 with the second client 140.

In one embodiment of the invention, at least one of the communication links 112, 128, and 132 utilizes the Internet. In one embodiment of the invention, the broadcasting source 120 is a place-shifting device or a data processing system with optional playback capability (e.g., a personal computer, or an equivalent) connected to a video source (e.g., television receiver, cable set-top-box, or an equivalent). In an alternative embodiment of the invention, the broadcasting source 120 is a video source itself (e.g., television receiver, cable set-top-box, or an equivalent) with built-in place-shifting capabilities. The video resource provided by the broadcast source can come in an analog format (e.g., component video, composite video, S-Video, Video Graphics Array (VGA), or an equivalent) or a digital format (e.g., High-Definition Multimedia Interface (HDMI), Digital Visual Interface (DVI), IEEE 1394 (FireWire), Serial Digital Interface (SDI), High Definition Serial Digital Interface (HD-SDI), TOSLINK® optical, EIAJ optical, ADAT optical, composite coax digital, or an equivalent). In one embodiment a place-shifting device includes an encoder or transcoder module to encode video data to a compressed format with variable compression bit-rate. In such an embodiment, the compression bit-rate will be adjusted dynamically to satisfy the slowest link conditions of the plurality of clients.

In one embodiment a module would be integrated into website software (e.g., social networking website software, or an equivalent) in order to publish a link to a broadcast source (e.g., a person willing to share access to their video resources within one or more optionally imposed limits on the scope of the access being offered, e.g., a pre-determined time, channel scope, or an equivalent limit). In another embodiment the access to the broadcast source is given individually and privately to every potential client.

In one embodiment of the invention, remote access to the broadcast source would be protected by some authentication scheme (e.g., password assigned by the owner of the broadcast source and communicated privately to the prospective clients). In another embodiment an access decision module could also be integrated into the website software to determine whether or not the prospective co-viewer will be given access to the video resources of the originator, based on one or more criteria (e.g., whether the prospective co-viewer is specifically listed on a block list, whether the prospective client meets all requirements for access (e.g., age, gender, location, or an equivalent), whether the playback capabilities of the prospective co-viewer are compatible with the broadcasting source, or an equivalent criteria). In various embodiments, the communication protocols used between each of the clients and between the first client and broadcasting source don't have to be the same. In one embodiment, each of the direct links may utilize a different communication protocol that can be either a proprietary protocol or some standard streaming protocol such as RTP or HTTP.

In one embodiment the coordinator can be implemented as a computer program running on a single server or distributed between multiple servers anywhere on the Internet. Use of multiple servers improves the reliability of the system (in one embodiment it can provide fault-tolerant redundancy protection where one of the servers becomes active only when one of the currently active servers goes down) and provides for load balancing when numbers of clients and broadcasting sources becomes too large to be handled by a single server and every server only serves a subset of the clients and broadcasting sources. In another embodiment the coordinator can be implemented as a dedicated hardware device or a number of devices linked together for fault-tolerant redundancy protection and load balancing.

Figure 2:
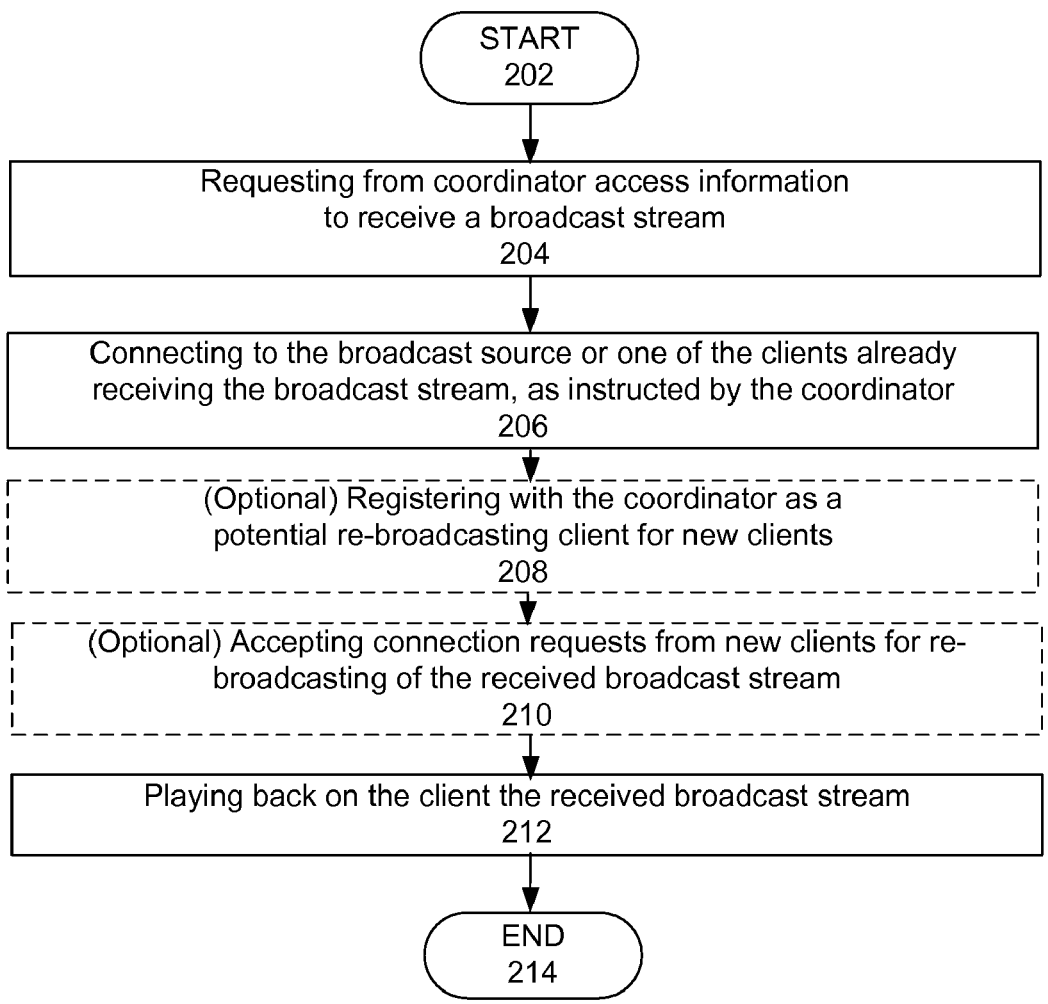
FIG. 2 illustrates a flowchart of a method to operate a video resource daisy-chain access system, in accordance with one embodiment of the invention.

FIG. 2 illustrates a flowchart of a method to operate a video resource daisy-chain access system, in accordance with one embodiment of the invention. The method starts in operation 202. Operation 204 is next and includes requesting from a coordinator access instructions to receive a broadcast stream from a broadcast source. Operation 206 is next and includes connecting to the broadcast source, or one of the clients already receiving the broadcast stream, as instructed by the coordinator. Operation 208 is next and (and optionally) includes registering with the coordinator as a potential re-broadcasting source for new clients. In one embodiment, this optional operation would also include announcing the available uplink bandwidth to the coordinator for future reference. Operation 210 is next and (and optionally) includes accepting connection requests from new clients for re-broadcasting of the received broadcast stream. Operation 212 is next and includes playing back on the client the received broadcast stream. The method ends in operation 214.

Figure 3:
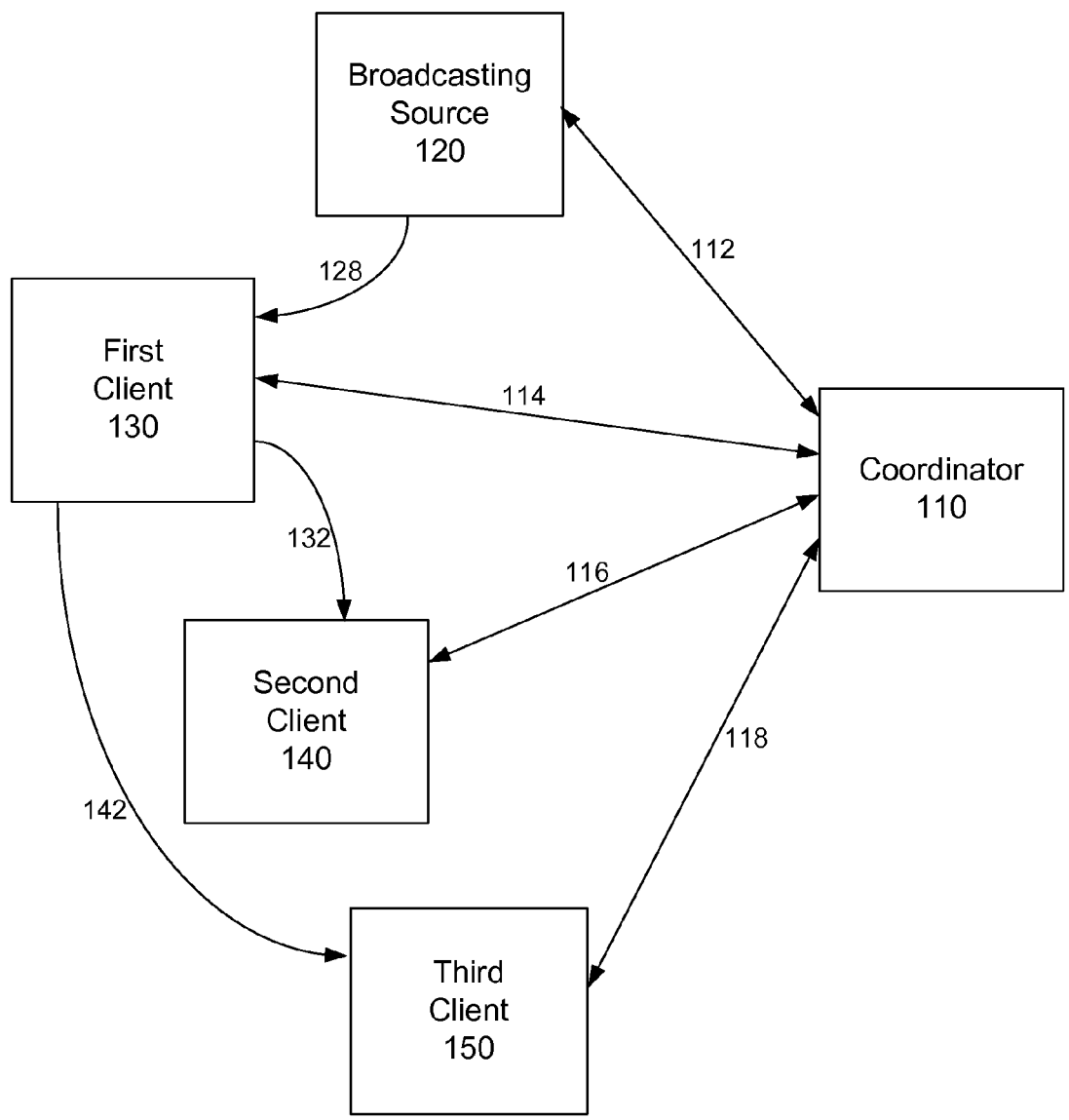
FIG. 3 illustrates a block diagram of a video resource daisy-chain access system, in accordance with one embodiment of the invention.

FIG. 3 illustrates a block diagram of a video resource daisy-chain access system, in accordance with one embodiment of the invention. This system includes a coordinator 110, a broadcasting source 120, a first client 130, a second client 140 and a third client 150. The coordinator 110 has communication links 112, 114, 116, and 118 with the broadcasting source 120, first client 130, second client 140, and third client 150, respectively. The broadcasting source 120 has a communication link 128 with the first client 130, which also has a communication link 132 with the second client 140, and the first client 130 also has a communication link 142 with the third client 150.

In one embodiment of the invention, at least one of the communication links 112, 128, 132 and 142 utilize the Internet. In one embodiment of the invention, the broadcasting source 120 is a place-shifting device or a data processing system with optional playback capability (e.g., a personal computer, or an equivalent) connected to a video source (e.g., television receiver, cable set-top-box, or an equivalent). In an alternative embodiment of the invention, the broadcasting source 120 is a video source itself (e.g., television receiver, cable set-top-box, or an equivalent) with built-in place-shifting capabilities.

Figure 4:
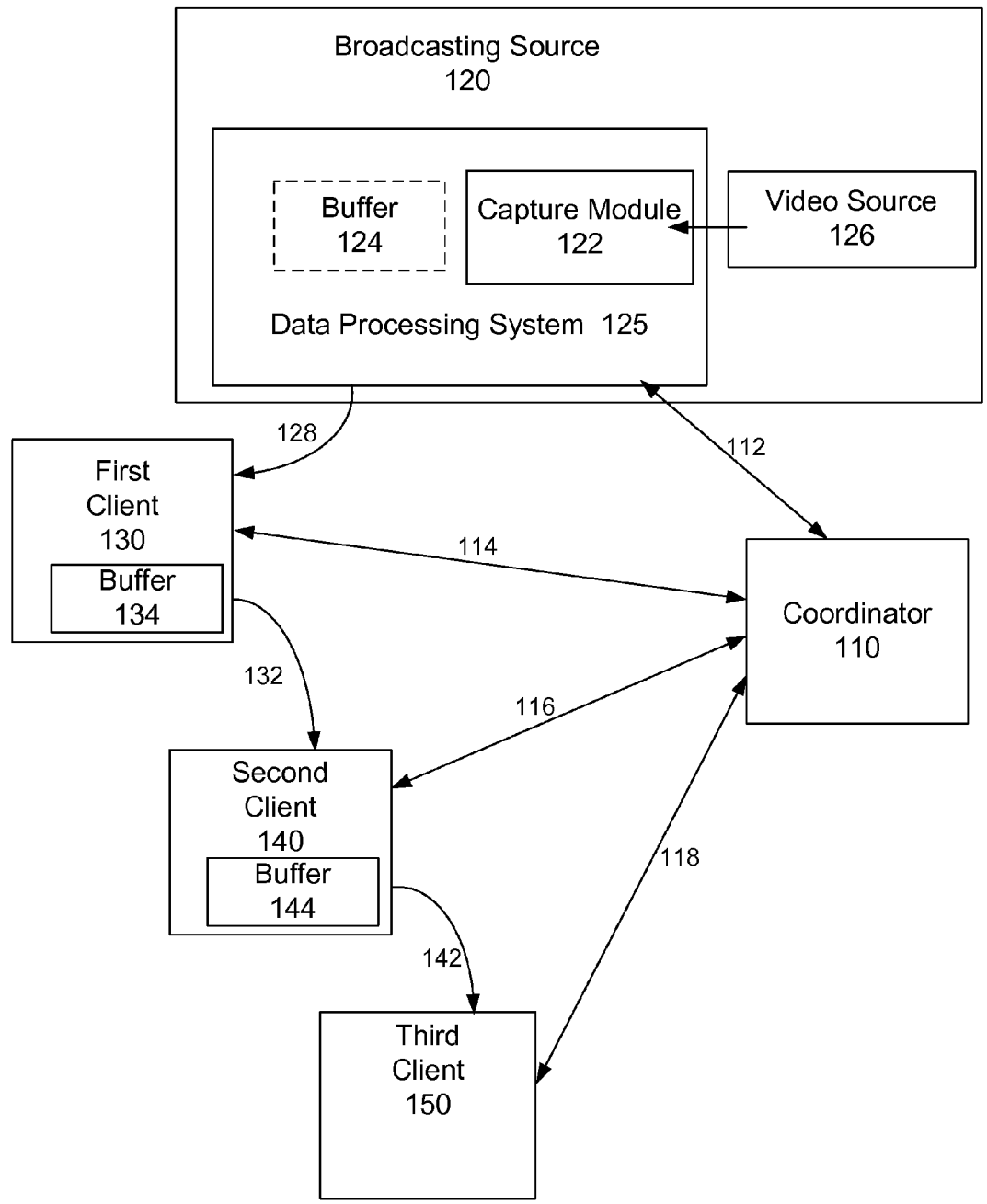
FIG. 4 illustrates a block diagram of a video resource daisy-chain access system, in accordance with one embodiment of the invention.

FIG. 4 illustrates a block diagram of a video resource daisy-chain access system, in accordance with one embodiment of the invention. This system includes a coordinator 110, a broadcasting source 120, a first client 130, a second client 140 and a third client 150. The coordinator 110 has communication links 112, 114, 116, and 118 with the broadcasting source 120, first client 130, second client 140, and third client 150, respectively. The broadcasting source 120 has a communication link 128 with the first client 130, which also has a communication link 132 with the second client 140, which also has a communication link 142 with the third client 150.

In one embodiment of the invention, at least one of the communication links 112, 128, 132 and 142 utilize the Internet. In one embodiment of the invention, the broadcasting source 120 is a data processing system 125 with optional playback capability (e.g., a personal computer, or an equivalent) having a capture module 122 connected to a video source 126, and an optional buffer 124. The optional buffer 124 would be used for delayed playback if the data processing system 125 has playback capability. The first client 130 has a buffer 134, and the second client 140 has a buffer 144.

Figure 5:
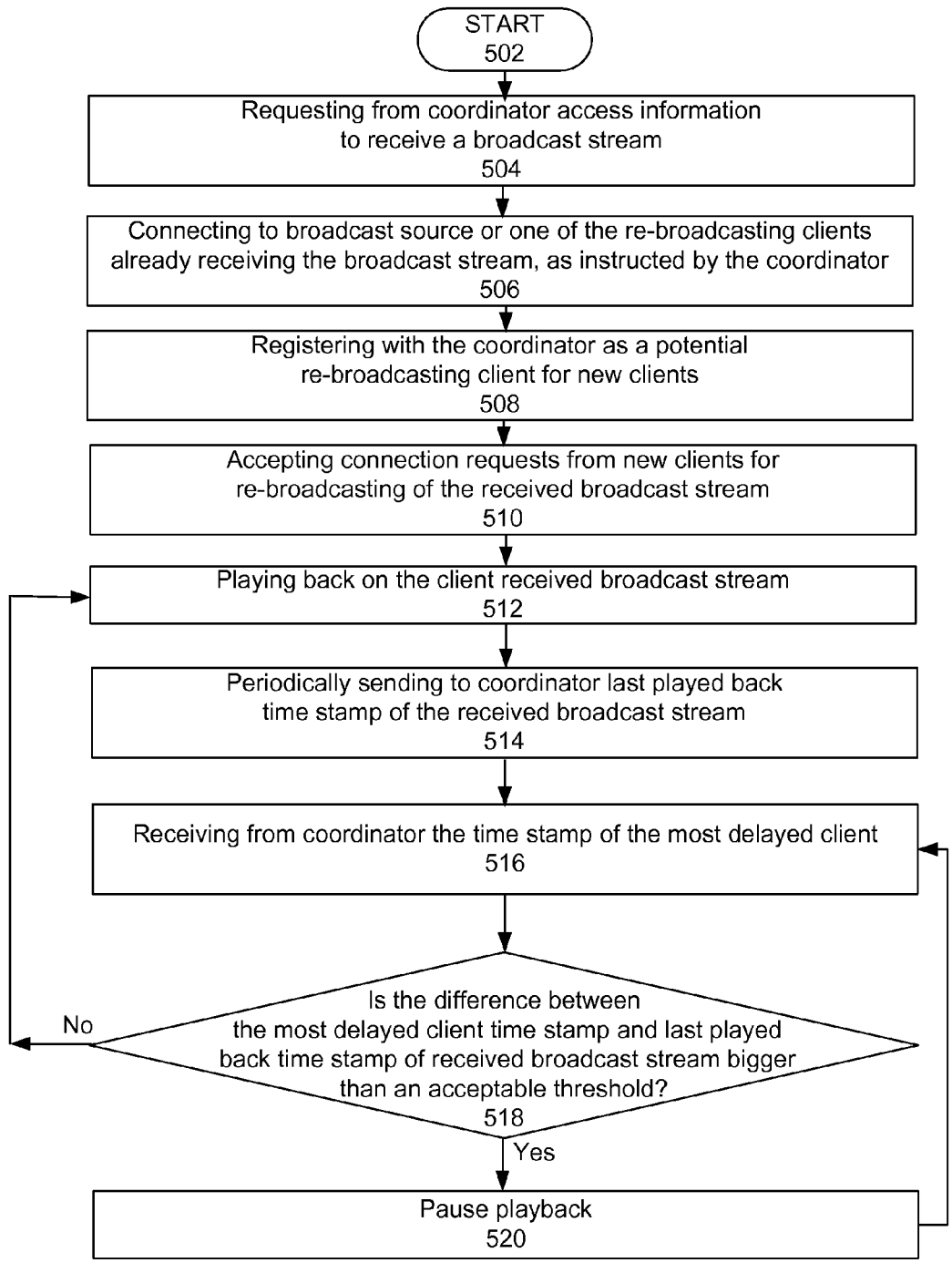
FIG. 5 illustrates a flowchart of a method to operate a video resource daisy-chain access system, in accordance with one embodiment of the invention.

FIG. 5 illustrates a flowchart of a method to operate a video resource daisy-chain access system, in accordance with one embodiment of the invention. The method ensures that video playback between all clients is synchronized and all clients watch the same video frame at any given moment regardless of the number of clients and the delay associated with propagation of the video signal through the network. The method starts in operation 502. Operation 504 is next and includes requesting from a coordinator access instructions to receive a broadcast stream from a broadcast source. Operation 506 is next and includes connecting to the broadcast source, or one of the re-broadcasting clients already receiving the broadcast stream, as instructed by the coordinator. Operation 508 is next and includes registering with the coordinator as a potential re-broadcasting client for new clients. In one embodiment, this would also include announcing the available uplink bandwidth to the coordinator for future reference. Operation 510 is next and includes accepting connection requests from new clients for re-broadcasting of the received broadcast stream. Operation 512 is next and includes playing back on the client the received broadcast stream. Operation 514 is next and includes periodically sending to the coordinator the last played back time stamp of the received broadcast stream. In one embodiment, the client would be sending the timestamps to the coordinator once every few seconds. Operation 516 is next and includes periodically receiving at a client, from the coordinator, the time stamp of the most delayed client (e.g., the lowest time stamp) received by the coordinator from all clients. Operation 518 is next and includes a test to determine if the difference between the most delayed time stamp and the last played back time stamp of the received broadcast stream bigger than an acceptable threshold? If the difference of the test of operation 518 is not bigger than the threshold, then operation 512 is next. If the difference of the test of operation 518 is bigger than the threshold, then operation 520 is next and includes buffering video data and pausing playback on a client until the time stamp of the most delayed client is substantially equal (or acceptably close) to the last played back time stamp at which point the playback of the video is resumed at normal speed. Operation 516 is next after operation 520. In at least one embodiment of the invention, the only information periodically sent by the coordinator to the clients (after the initial connection information) is the most delayed time stamp, and the decision to delay playback is made locally by a client comparing the most delayed time stamp with the last playback time stamp seen and stored by the client. The coordinator sends the most delayed time stamp every few seconds by picking the lowest time stamp from all the time stamps received from clients as illustrated by the FIG. 15.

Figure 6:
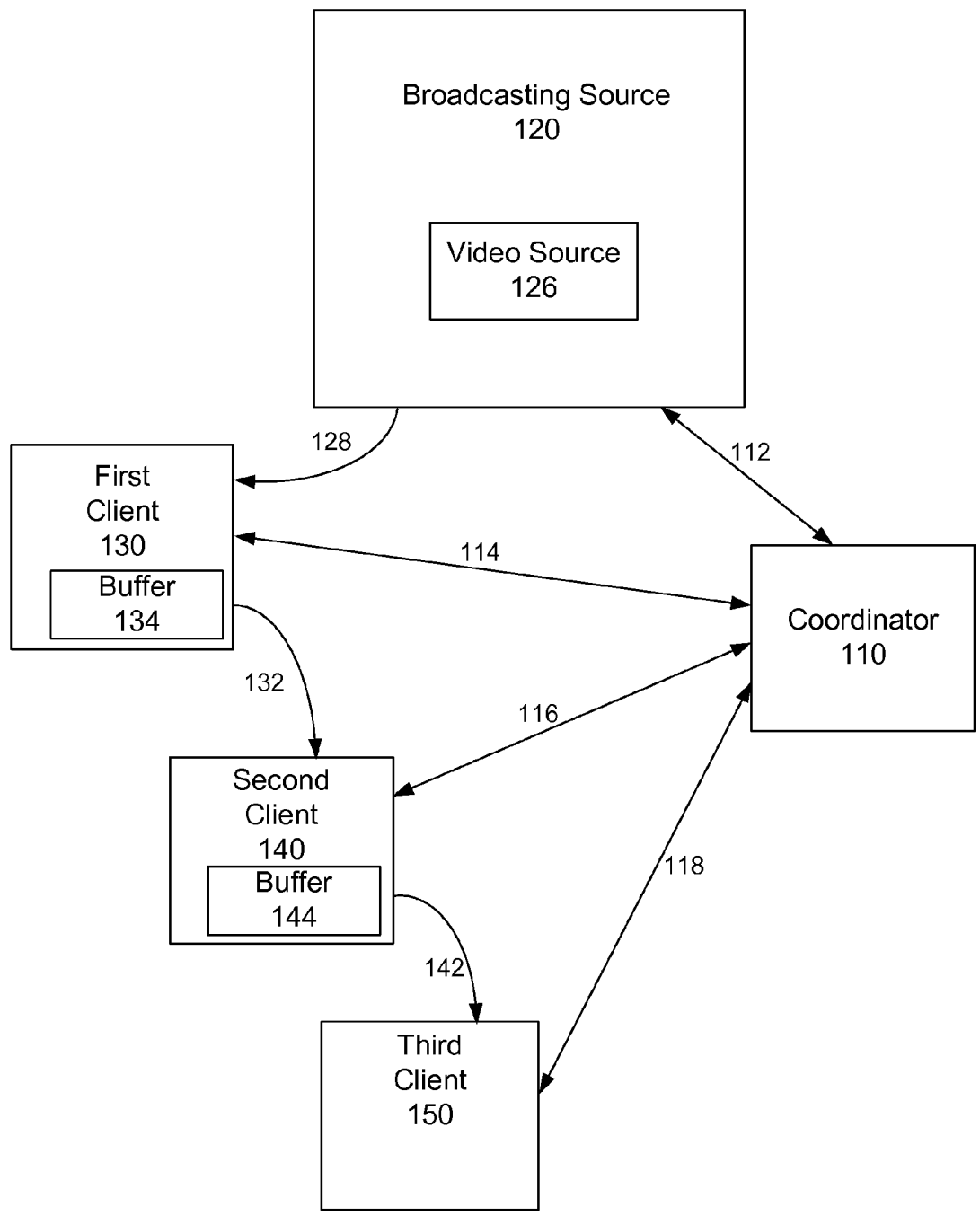
FIG. 6 illustrates a block diagram of a video resource daisy-chain access system, in accordance with one embodiment of the invention.

FIG. 6 illustrates a block diagram of a video resource daisy-chain access system, in accordance with one embodiment of the invention. This system includes a coordinator 110, a broadcasting source 120, a first client 130, a second client 140 and a third client 150. The coordinator 110 has communication links 112, 114, 116, and 118 with the broadcasting source 120, first client 130, second client 140, and third client 150, respectively. The broadcasting source 120 has a communication link 128 with the first client 130, which also has a communication link 132 with the second client 140, which also has a communication link 142 with the third client 150.

In one embodiment of the invention, at least one of the communication links 112, 128, 132 and 142 utilize the Internet. In one embodiment of the invention, the broadcasting source 120 is a video source 126 (e.g., television receiver, cable set-top-box, or an equivalent) with built-in place-shifting capabilities. The first client 130 has a buffer 134, and the second client 140 has a buffer 144.

Figure 7:
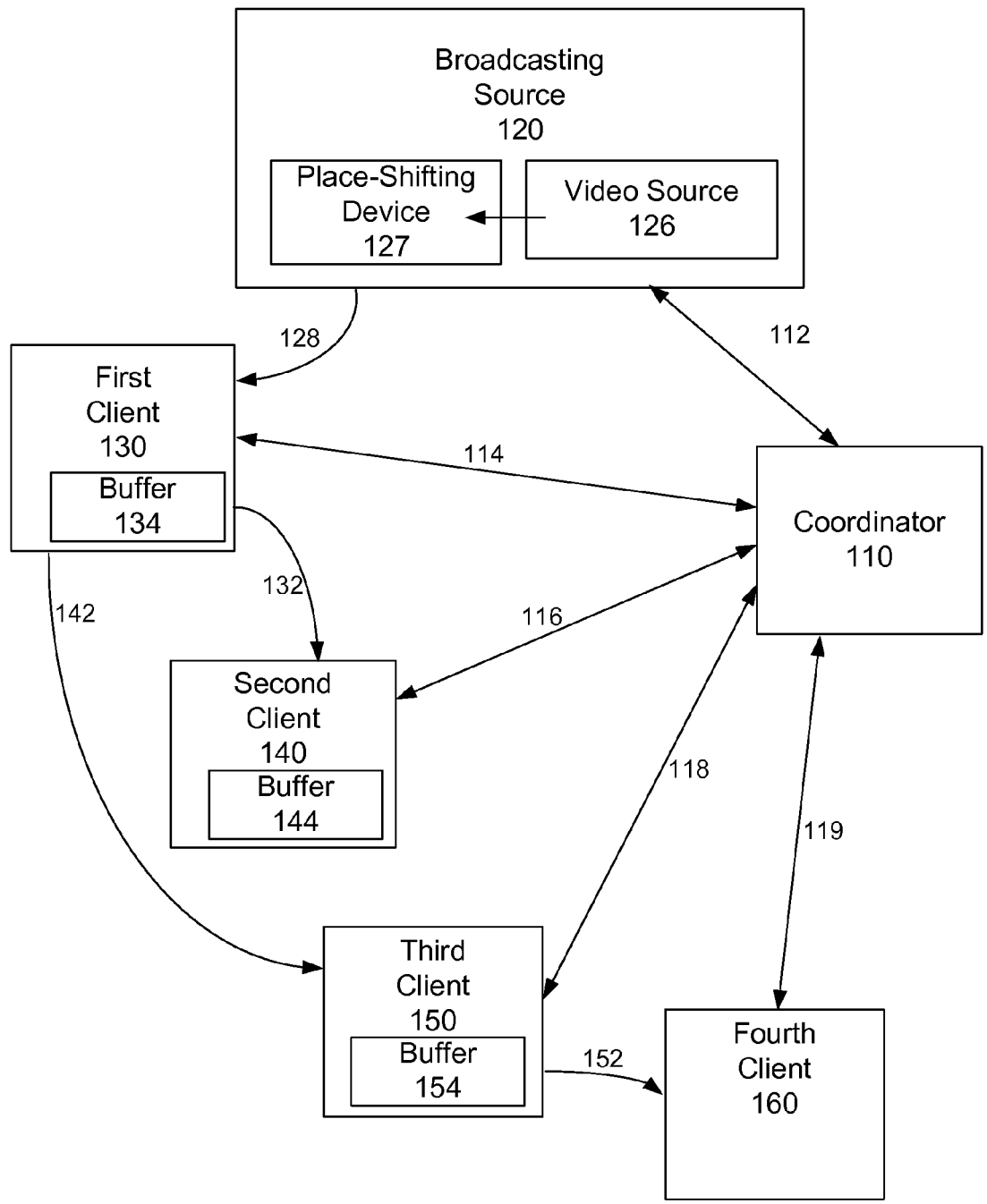
FIG. 7 illustrates a block diagram of a video resource daisy-chain access system, in accordance with one embodiment of the invention.

FIG. 7 illustrates a block diagram of a video resource daisy-chain access system, in accordance with one embodiment of the invention. This system includes a coordinator 110, a broadcasting source 120, a first client 130, a second client 140, a third client 150, and a fourth client 160. The coordinator 110 has communication links 112, 114, 116, 118, and 119 with the broadcasting source 120, first client 130, second client 140, third client 150, and fourth client 160, respectively. The broadcasting source 120 has a communication link 128 with the first client 130, which also has a communication link 132 with the second client 140 and a communication link 142 with the third client 150, which also has a communication link 152 with the fourth client 160.

In one embodiment of the invention, at least one of the communication links 112, 128, 132, 142, and 152 utilize the Internet. In one embodiment of the invention, the broadcasting source 120 is a place-shifting device 127 connected to a video source 126. The first client 130 has a buffer 134, and the second client 140 has buffer 144, and the third client 150 has a buffer 154. In one embodiment, these buffers may only allow the pause of playback of a video stream. In another embodiment, these buffers may allow playback to be paused, or slowed-down, as necessary to achieve essentially synchronized playback among all the clients.

Figure 8:
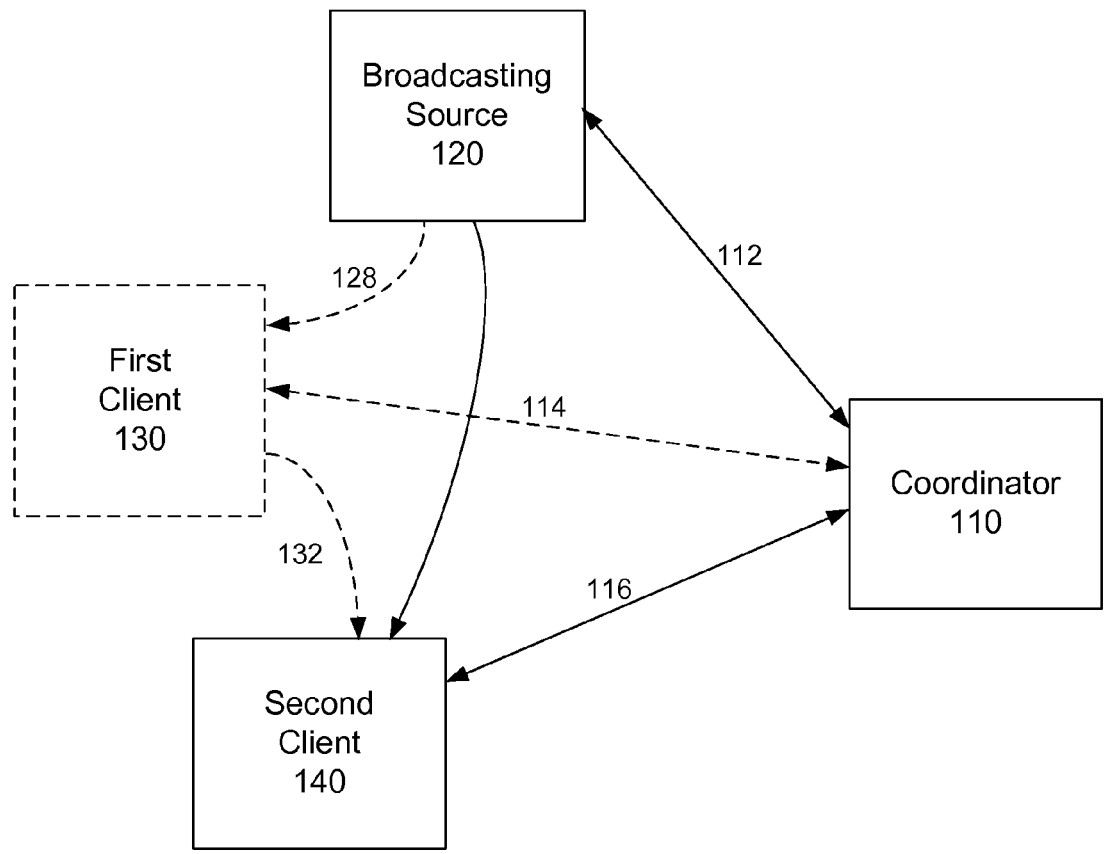
FIG. 8 illustrates a block diagram of a video resource daisy-chain access system, in accordance with one embodiment of the invention.

FIG. 8 illustrates a block diagram of a video resource daisy-chain access system, in accordance with one embodiment of the invention. This system includes a coordinator 110, a broadcasting source 120, a first client 130, and a second client 140. The coordinator 110 had communication links 112, 114, and 116 with the broadcasting source 120, first client 130, second client 140, respectively. The broadcasting source 120 has a communication link 128 with the first client 130, which also had a communication link 132 with the second client 140.

In one embodiment of the invention, at least one of the communication links 112, 128, and 132 utilizes the Internet. In one embodiment of the invention, the broadcasting source 120 replaces the first client 130, when the first client 130 has become unable to re-broadcast to the second client 140 for some reason (e.g., breakage of one or both of the communication links 128 or 132, or an intrinsic hardware failure in the first client 130 itself), or the communication link 114 to the coordinator 110 has failed. The second client 140 is instructed by the coordinator 110 to receive a broadcast stream directly from the broadcasting source 120. In an alternative embodiment of the invention, the replacement source for the broadcasting stream would be another operational client (not shown) acting as a broadcasting source.

Figure 9:
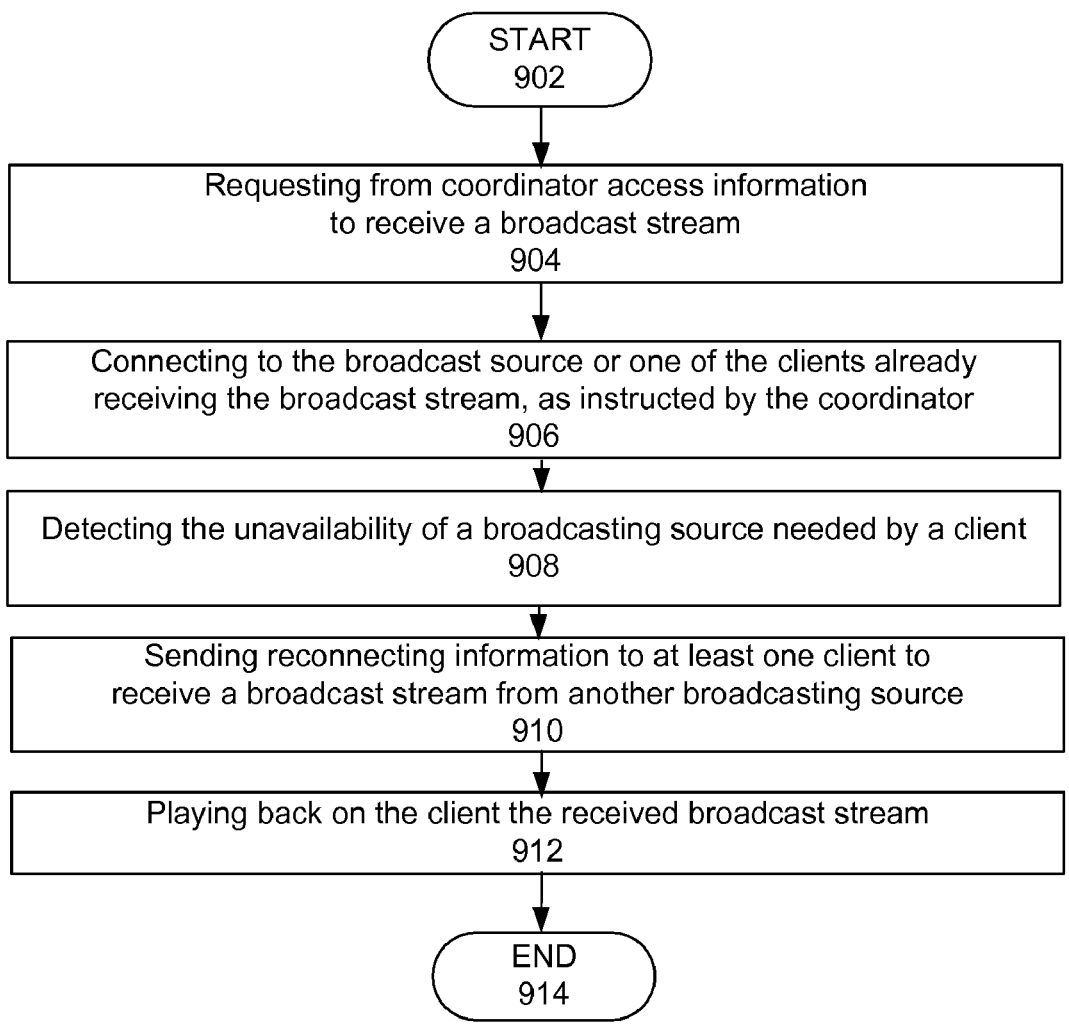
FIG. 9 illustrates a flowchart of a method to operate a video resource daisy-chain access system, in accordance with one embodiment of the invention.

FIG. 9 illustrates a flowchart of a method to operate a video resource daisy-chain access system, in accordance with one embodiment of the invention. The method starts in operation 902. Operation 904 is next and includes requesting from a coordinator access instructions to receive a broadcast stream from a broadcast source. Operation 906 is next and includes connecting to the broadcast source, or one of the clients already receiving the broadcast stream, as instructed by the coordinator. Operation 908 is next and includes detecting the unavailability of a broadcasting source (e.g., the broadcast source or a client acting as a broadcast source) needed by a client. Operation 910 is next and includes sending reconnecting information to at least one client to receive a broadcast stream from another broadcasting source. Operation 912 is next and includes playing back on the client the received broadcast stream. The method ends in operation 914.

Figure 10:
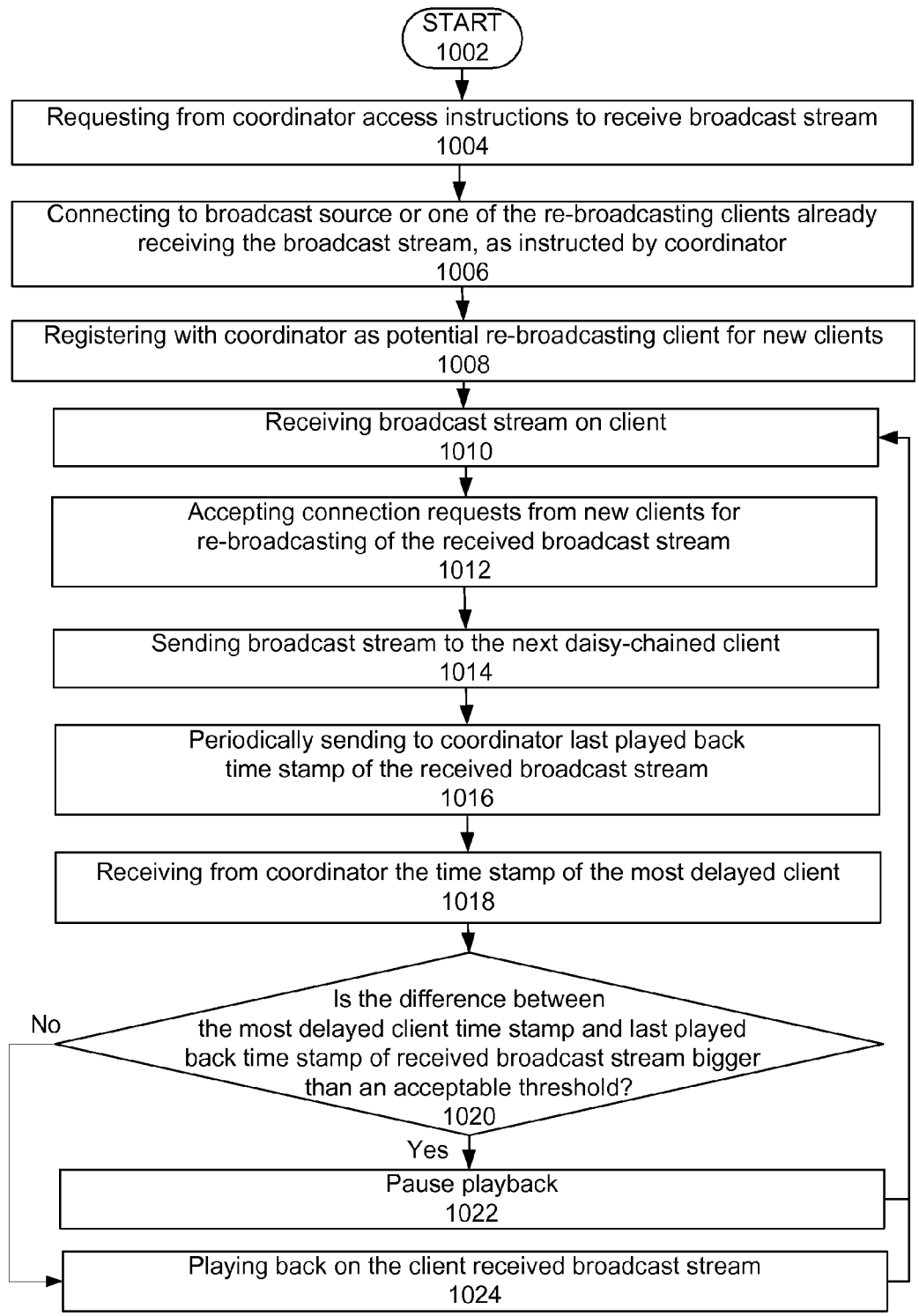
FIG. 10 illustrates a flowchart of a method to operate a video resource daisy-chain access system, in accordance with one embodiment of the invention.

FIG. 10 illustrates a flowchart of a method to operate a video resource daisy-chain access system, in accordance with one embodiment of the invention. The method starts in operation 1002. Operation 1004 is next and includes requesting from a coordinator access instructions to receive a broadcast stream from a broadcast source. Operation 1006 is next and includes connecting to the broadcast source, or one of the re-broadcasting clients already receiving the broadcast stream, as instructed by the coordinator. Operation 1008 is next and includes registering with the coordinator as a potential re-broadcasting source for new clients. In one embodiment, this would also include announcing the available uplink bandwidth to the coordinator for future reference. Operation 1010 is next and includes receiving the broadcast stream on the client. Operation 1012 is next and includes accepting connection requests from new clients for re-broadcasting of the received broadcast stream. Operation 1014 is next and includes sending the broadcast stream to the next daisy-chained client. Operation 1016 is next and includes periodically sending to the coordinator the last played back time stamp of the received broadcast stream. Operation 1018 is next and includes periodically receiving at a client, from the coordinator, the time stamp of the most delayed client (e.g., the lowest time stamp) received by the coordinator from all clients. Operation 1020 is next and includes a test to determine if the difference between the most delayed time stamp and the last played back time stamp of the received broadcast stream bigger than an acceptable threshold? If the difference of the test of operation 1020 is bigger than the acceptable threshold, then operation 1022 is next and includes pausing playback of the client until the time stamp of the most delayed client is equal (or acceptably close) to the last played back time stamp. Operation 1010 is next after operation 1022. If the difference of the test of operation 1020 is not bigger than the acceptable threshold, then operation 1024 is next. Operation 1024 includes playing back on the client the received broadcast stream. Then operation 1010 is next after operation 1024.

Figure 11:
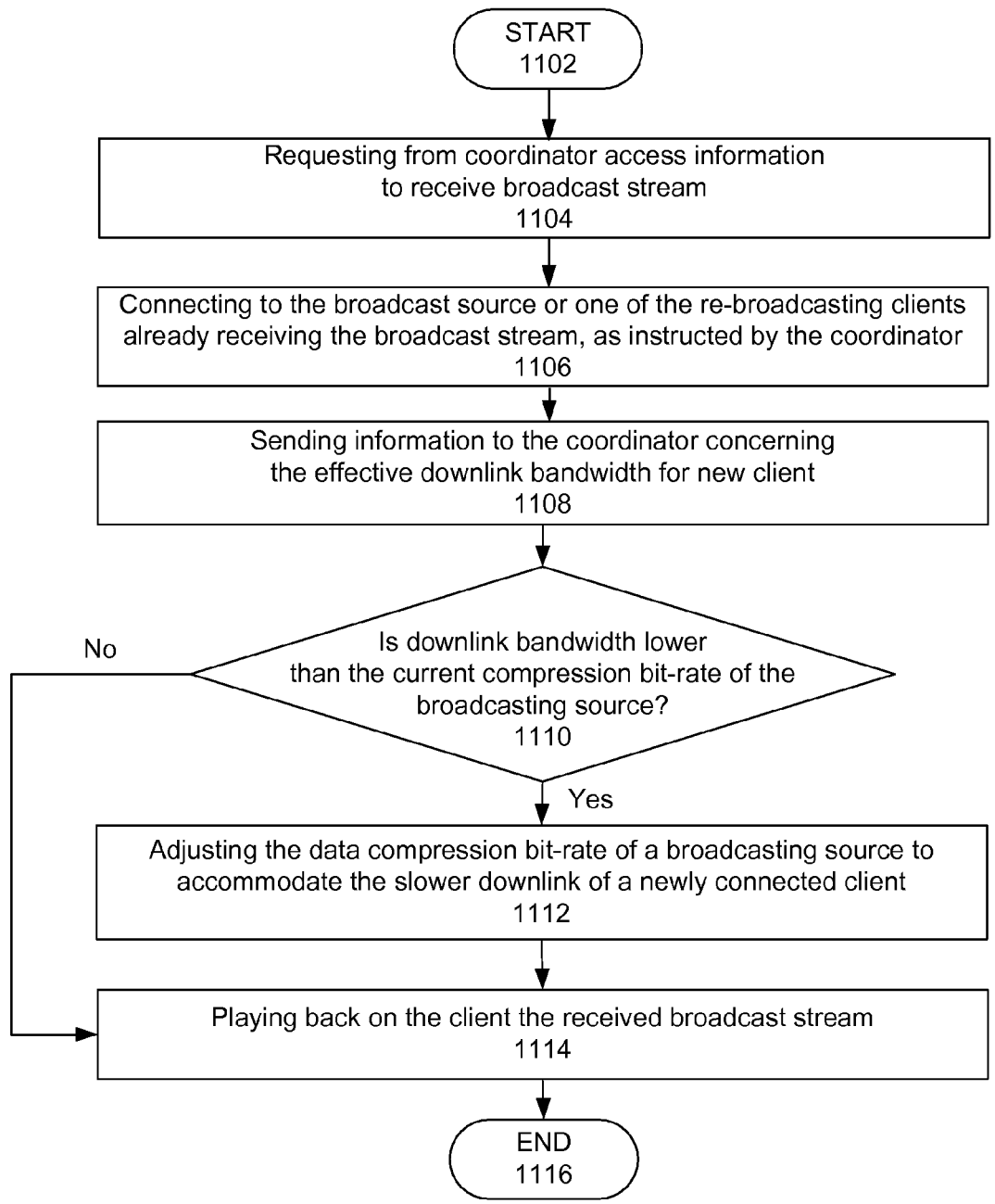
FIG. 11 illustrates a flowchart of a method to operate a video resource daisy-chain access system, in accordance with one embodiment of the invention.

FIG. 11 illustrates a flowchart of a method to operate a video resource daisy-chain access system, in accordance with one embodiment of the invention. The method starts in operation 1102. Operation 1104 is next and includes requesting from a coordinator access information to receive a broadcast stream from a broadcast source. Operation 1106 is next and includes connecting to the broadcast source, or one of the clients already receiving the broadcast stream, as instructed by the coordinator. Operation 1108 is next and includes a new client sending information concerning the effective downlink bandwidth that can depend on one or more connection factors (e.g., the number of hops between the client and the source of the broadcast stream, the uplink bandwidth at the source of the stream, the downlink bandwidth of the client, and/or equivalent connection factors). In one embodiment of the system, the downlink bandwidth is calculated by the coordinator as the lowest between two values: the uplink bandwidth at the source and the downlink bandwidth at the receiving client. The uplink bandwidth at the source and the downlink bandwidth of the receiving client are measured ahead of time and from time to time by running Internet speed tests (many of them are available on the Internet now). At the time of the connection both the source and the client send this information to the coordinator, and the coordinator determines the effective downlink bandwidth by selecting the lowest among the two. In another embodiment of the system, the downlink bandwidth is determined by running a test connection between the source and the client at the time when connection is requested to get more accurate and up-to-date bandwidth information. In one embodiment, the time spent on running the test (in the order of several minutes) will introduce a delay between the time when the client requested the connection and the time when the client starts receiving the stream. Operation 1110 is next and includes a test if the downlink bandwidth of the newly connected client is lower than the current compression bit-rate of the place-shifting device of a broadcasting source. If the answer is No then operation 1114 is next. If the answer to the test in operation 1110 is Yes, then the operation 1112 is next and includes adjusting the data compression bit-rate in the place-shifting device of a broadcasting source to accommodate the slower downlink of a newly connected client. In one embodiment of the system, each of the packets of the stream sent by the broadcasting source is tagged with the currently effective compression bit-rate. In one embodiment, each of the re-broadcasting clients will only re-broadcast the received packet upstream if the effective downlink bandwidth of the receiving client is equal to or greater than the bit-rate of the packet. This is done to ensure that the bit-rate of the stream received by each client doesn't exceed its effective downlink bandwidth. Operation 1114 is next and includes receiving the adjusted data compression bit-rate of the broadcast stream and playing it back on a client. The method ends in operation 1116.

Figure 12:
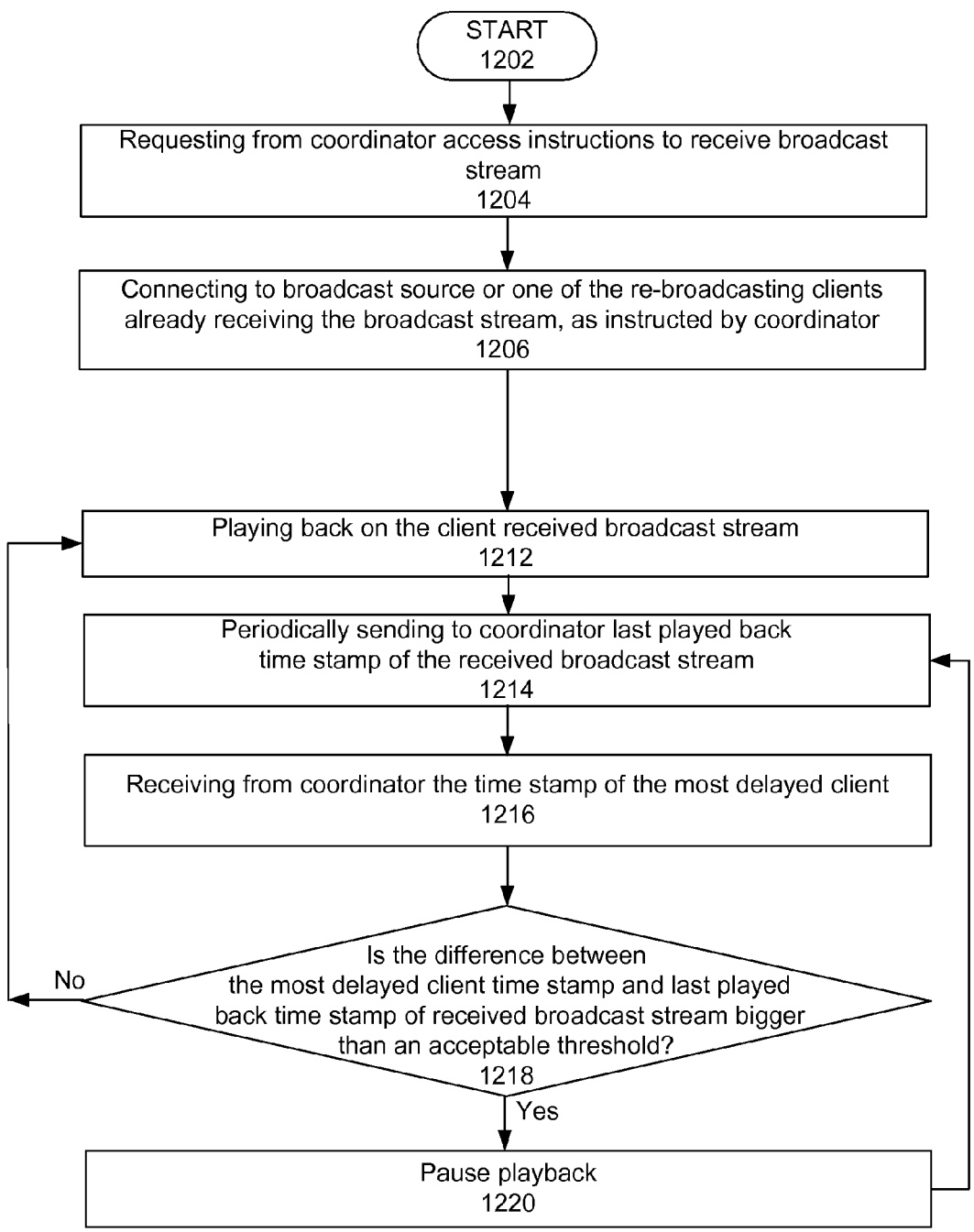
FIG. 12 illustrates a flowchart of a method to operate a video resource daisy-chain access system, in accordance with one embodiment of the invention.

FIG. 12 illustrates a flowchart of a method to operate a video resource daisy-chain access system, in accordance with one embodiment of the invention. This method is regarding a client that does not have or choose to be a re-broadcast source, but only wants to be connected to some broadcast source or another client. The method starts in operation 1202. Operation 1204 is next and includes requesting from a coordinator access instructions to receive a broadcast stream from a broadcast source. Operation 1206 is next and includes connecting to the broadcast source, or one of the clients already receiving the broadcast stream, as instructed by the coordinator. Operation 1212 is next and includes playing back on the client the received broadcast stream. Operation 1214 is next and includes periodically sending to the coordinator the last played back time stamp of the received broadcast stream. Operation 1216 is next and includes periodically receiving at a client, from the coordinator, the time stamp of the most delayed client (e.g., the lowest time stamp) received by the coordinator from all clients. Operation 1218 is next and includes a test to determine if the difference between the most delayed time stamp and the last played back time stamp of the received broadcast stream bigger than an acceptable threshold? If the difference of the test of operation 1218 is not bigger than the acceptable threshold, then operation 1212 is next. If the difference of the test of operation 1218 is bigger than the acceptable threshold, then operation 1220 is next and includes pausing playback until the last playback time stamp is essentially equal (or acceptably close) to the most delayed time stamp. Operation 1214 is next after operation 1220.

Figure 13:
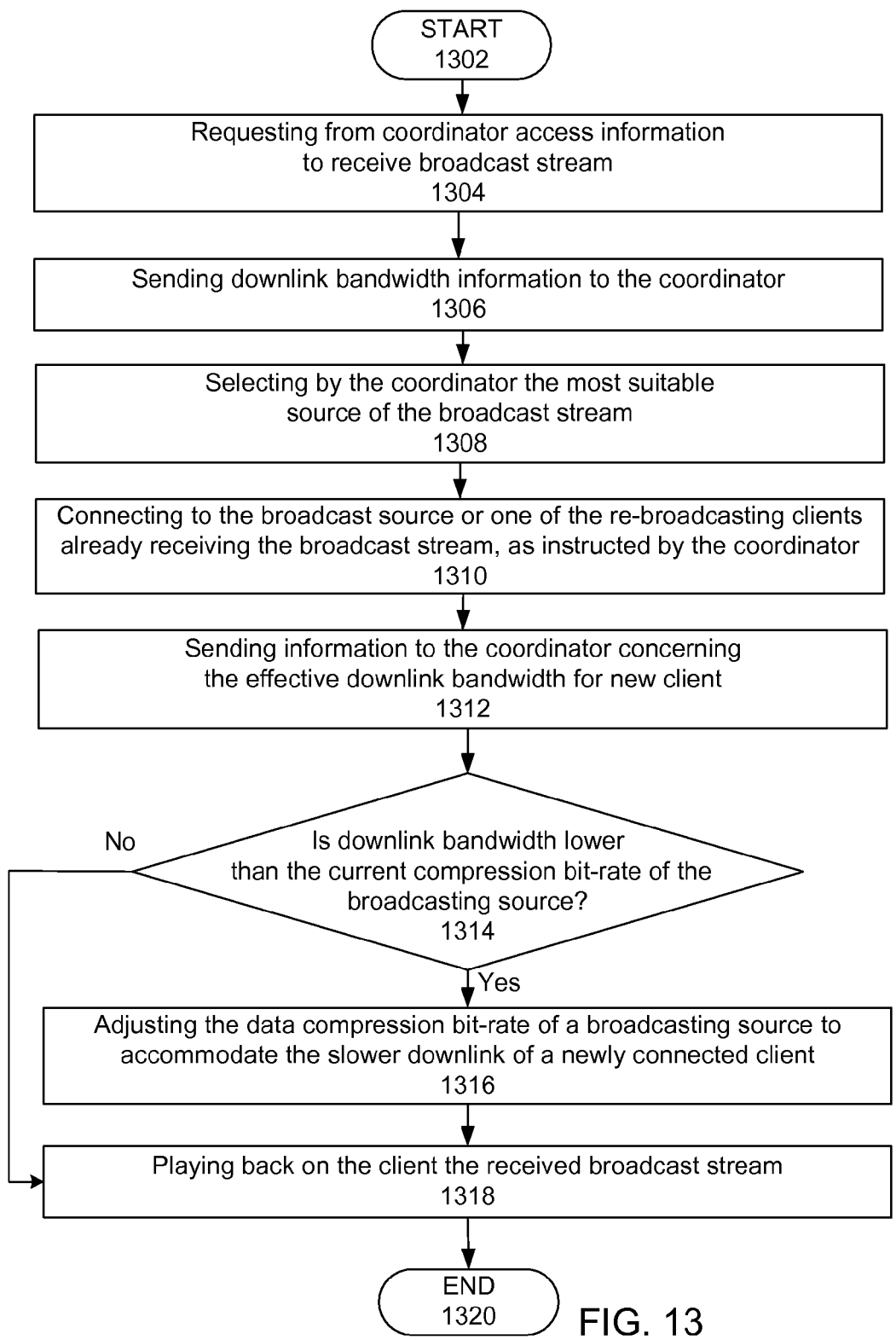
FIG. 13 illustrates a flowchart of a method to operate a video resource daisy-chain access system, in accordance with one embodiment of the invention.

FIG. 13 illustrates a flowchart of a method to operate a video resource daisy-chain access system, in accordance with one embodiment of the invention. The method starts in operation 1302. Operation 1304 is next and includes requesting from a coordinator access information to receive a broadcast stream from a broadcast source. Operation 1306 is next and includes sending downlink bandwidth information to the coordinator. In one embodiment of the invention, the downlink bandwidth is calculated by the client ahead of time and from time to time by running an off-the-shelf Internet speed test. Operation 1308 is next and includes selecting the most suitable source of the broadcast stream among the broadcasting source and the re-broadcasting clients already receiving the stream. In one embodiment of the invention, the most suitable source of the broadcast stream is determined by comparing the remaining uplink bandwidth of the potential source and the downlink bandwidth of the new client. The remaining uplink bandwidth of the potential source is calculated as the uplink bandwidth of the potential source minus the compression bit-rate of the place-shifting device in the broadcasting source multiplied by the number of clients already connected to the potential source if any. In one embodiment of the invention, the most suitable source will be the one that has remaining uplink bandwidth greater than the minimum between the downlink bandwidth of the new client and current compression rate, but has the lowest remaining uplink bandwidth among such sources. If there are no potential sources that have the remaining uplink bandwidth greater than the minimum between the downlink bandwidth of the new client and current compression rate, then the best potential source is the one that has the highest uplink bandwidth. Operation 1310 is next and includes connecting to the broadcast source, or one of the re-broadcasting clients already receiving the broadcast stream, as instructed by the coordinator. Operation 1312 is next and includes new client sending information concerning the effective downlink bandwidth that can depend on one or more connection factors (e.g., the number of hops between the client and the source of the broadcast stream, the uplink bandwidth at the source of the stream, the downlink bandwidth of the client, and/or equivalent connection factors). In one embodiment of the system, the downlink bandwidth is calculated by the coordinator as the lowest between two values: the uplink bandwidth at the source and the downlink bandwidth at the receiving client. The uplink bandwidth at the source and the downlink bandwidth of the receiving client are measured ahead of time and periodically by running Internet speed tests (many of them are available on the Internet now). At the time of the connection both the source and the client send this information to the coordinator, and the coordinator determines the effective downlink bandwidth by selecting the lowest among the two. In another embodiment of the system, the downlink bandwidth is determined by running a test connection between the source and the client at the time when connection is requested to get more accurate and up-to-date bandwidth information. In this embodiment the time spent on running the test (in some cases it could be on the order of several seconds or minutes) will introduce a delay between the time when the client requested the connection and the time when the client starts receiving the stream. Operation 1314 is next and includes a test if the downlink bandwidth of the newly connected client is lower than the current compression bit-rate of the place-shifting device of a broadcasting source. If the answer to the test of operation 1314 is No, then operation 1318 is next. If answer to the test of operation 1314 is Yes, then operation 1316 is next and includes adjusting the data compression bit-rate in the place-shifting device of a broadcasting source to accommodate the slower downlink of a newly connected client. In one embodiment of the system, each of the packets of the stream sent by the broadcasting source is tagged with the currently effective compression bit-rate. In that embodiment each of the re-broadcasting clients will only re-broadcast the received packet upstream if the effective downlink bandwidth of the receiving client is equal to or greater than the bit-rate of the packet. This is done to ensure that the bit-rate of the stream received by each client doesn't exceed its effective downlink bandwidth. Operation 1318 is next and includes receiving the adjusted data compression bit-rate of the broadcast stream and playing it back on a client. The method ends in operation 1320.

Figure 14:
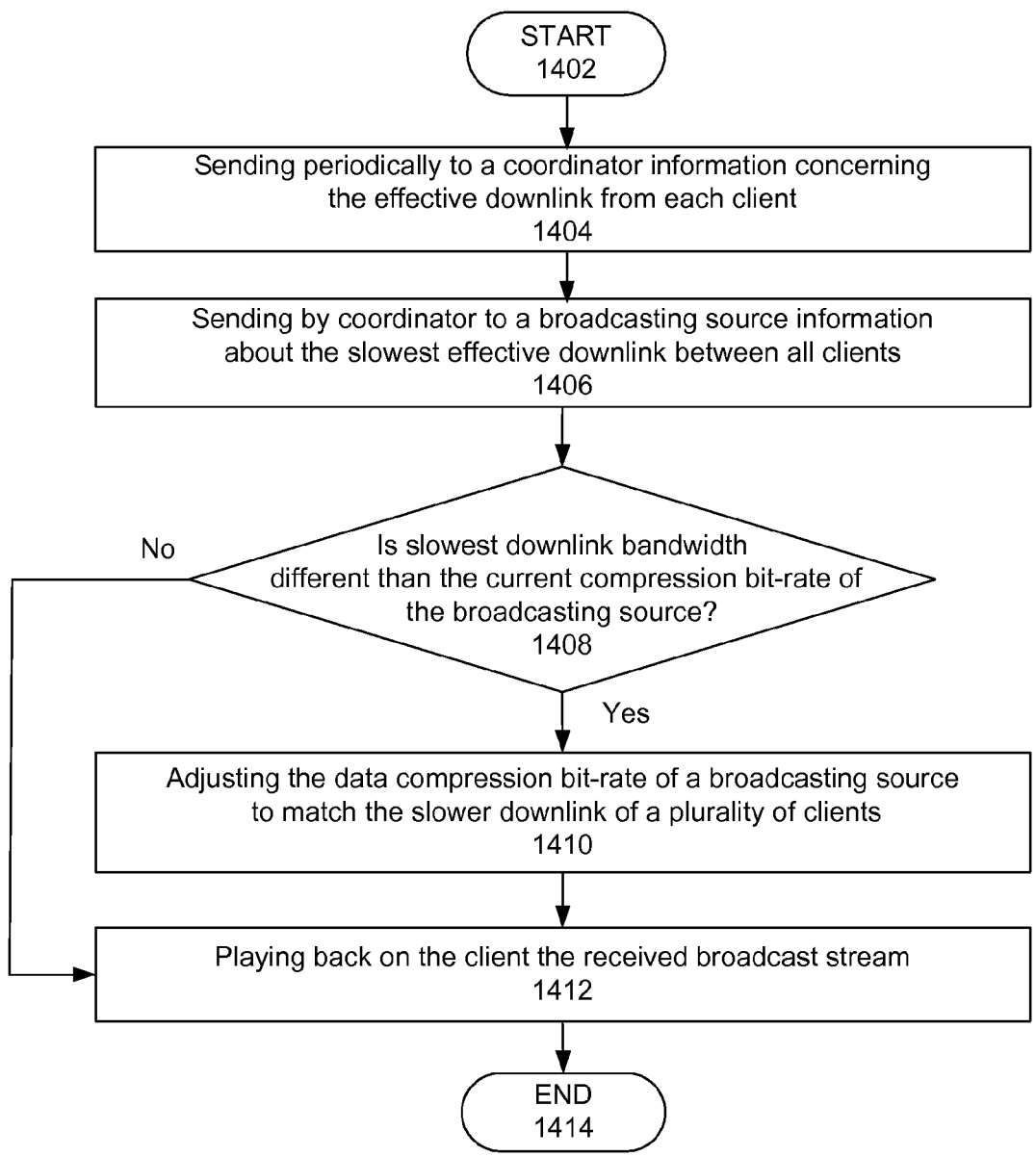
FIG. 14 illustrates a flowchart of a method to operate a video resource daisy-chain access system, in accordance with one embodiment of the invention.

FIG. 14 illustrates a flowchart of a method to operate a video resource daisy-chain access system, in accordance with one embodiment of the invention. The method has to do with dynamic adjustment of the compression bit-rate for the most optimal use of the bandwidth between all clients. Once in a while the bit-rate can be adjusted up or down depending on whether the slowest downlink of the plurality of clients has increased (for example when the slowest client has dropped off of the daisy chain) or decreased (for example when new client just joined that has slower effective downlink than the rest of the clients, or network conditions have deteriorated). The method starts in operation 1402. Operation 1404 is next and includes sending periodically (e.g., every few seconds in one embodiment) by each client to a coordinator information concerning the client's effective downlink bandwidth. In one embodiment the effective downlink is calculated at the time of the connection and is stored by the client to be sent periodically to the coordinator. In another embodiment the effective downlink is periodically (every few seconds) calculated by the clients by accumulating, exchanging and analyzing the statistics information such as the number of dropped packets versus the number of sent packets. Operation 1406 is next and includes sending by the coordinator information about the slowest effective downlink bandwidth between all clients to a broadcasting source. Operation 1408 is next and includes a test if the slowest downlink bandwidth of the plurality of clients is different (lower or greater) than the current compression bit-rate of the place-shifting device of a broadcasting source. If the answer to the test of operation 1408 is No, then operation 1412 is next. If the answer to the test of operation 1408 is Yes, then operation 1410 is next and includes adjusting the data compression bit-rate in the place-shifting device of a broadcasting source up or down to match the slowest downlink bandwidth of a plurality of clients. In one embodiment of the system, each of the packets of the stream sent by the broadcasting source is tagged with the currently effective compression bit-rate. In one embodiment each of the re-broadcasting clients will only re-broadcast the received packet upstream if the effective downlink bandwidth of the receiving client is equal to or greater than the bit-rate of the packet. That is done to ensure that the bit-rate of the stream received by each client doesn't exceed its effective downlink bandwidth. Operation 1412 is next and includes receiving the adjusted data compression bit-rate of the broadcast stream and playing it back on a client. The method ends in operation 1414.

Figure 15:
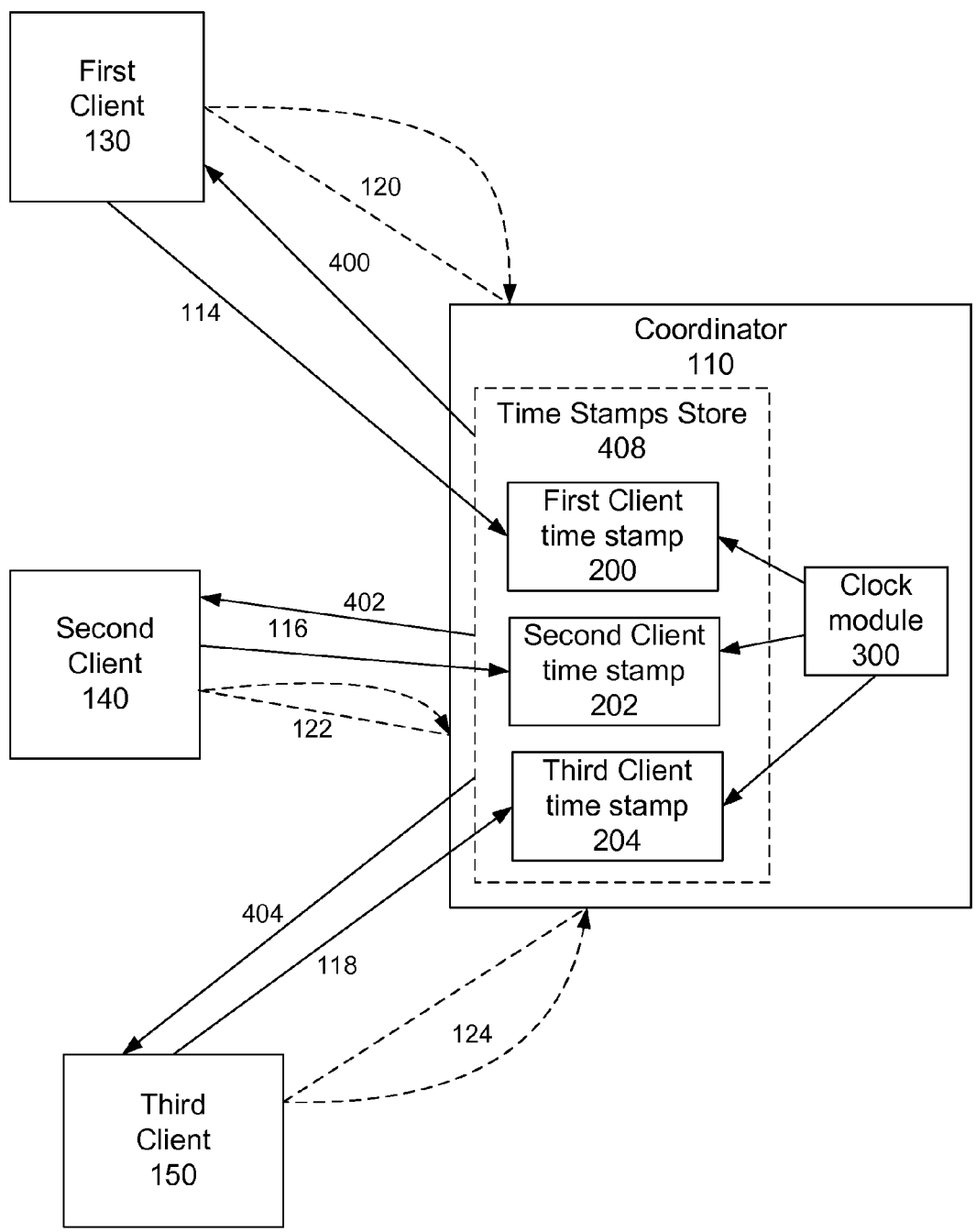
FIG. 15 illustrates a block diagram of a video resource daisy-chain access system, in accordance with one embodiment of the invention.

FIG. 15 illustrates a block diagram of a video resource daisy-chain access system, in accordance with one embodiment of the invention. This block diagram illustrates with how a coordinator keeps track of the play back time stamps sent by the clients and updates the clients with the most delayed time stamp. This system includes a coordinator 110, a first client 130, a second client 140, and a third client 150. The coordinator 110 has communication links 114, 120, and 400 with the first client 130, communication links 116, 122, and 402 with the second client 140, and communication links 118, 124, and 404 with the third client 140. Group of communication links between coordinator and each client may represent the same physical communication link respectively but illustrate different actions taken over that communication link. Coordinator 110 consists of Time Stamps Store 408 that stores playback time stamps received from each client in the First Client time stamp 200, Second Client time stamp 202 and Third Client time stamp 204 respectively, and Clock module 300 that is used to continuously increment stored time stamps every millisecond to keep them updated independently from the clients and not to fall behind until they are updated by the clients next time through the communication links 114, 116 and 118, respectively.

Figure 16:
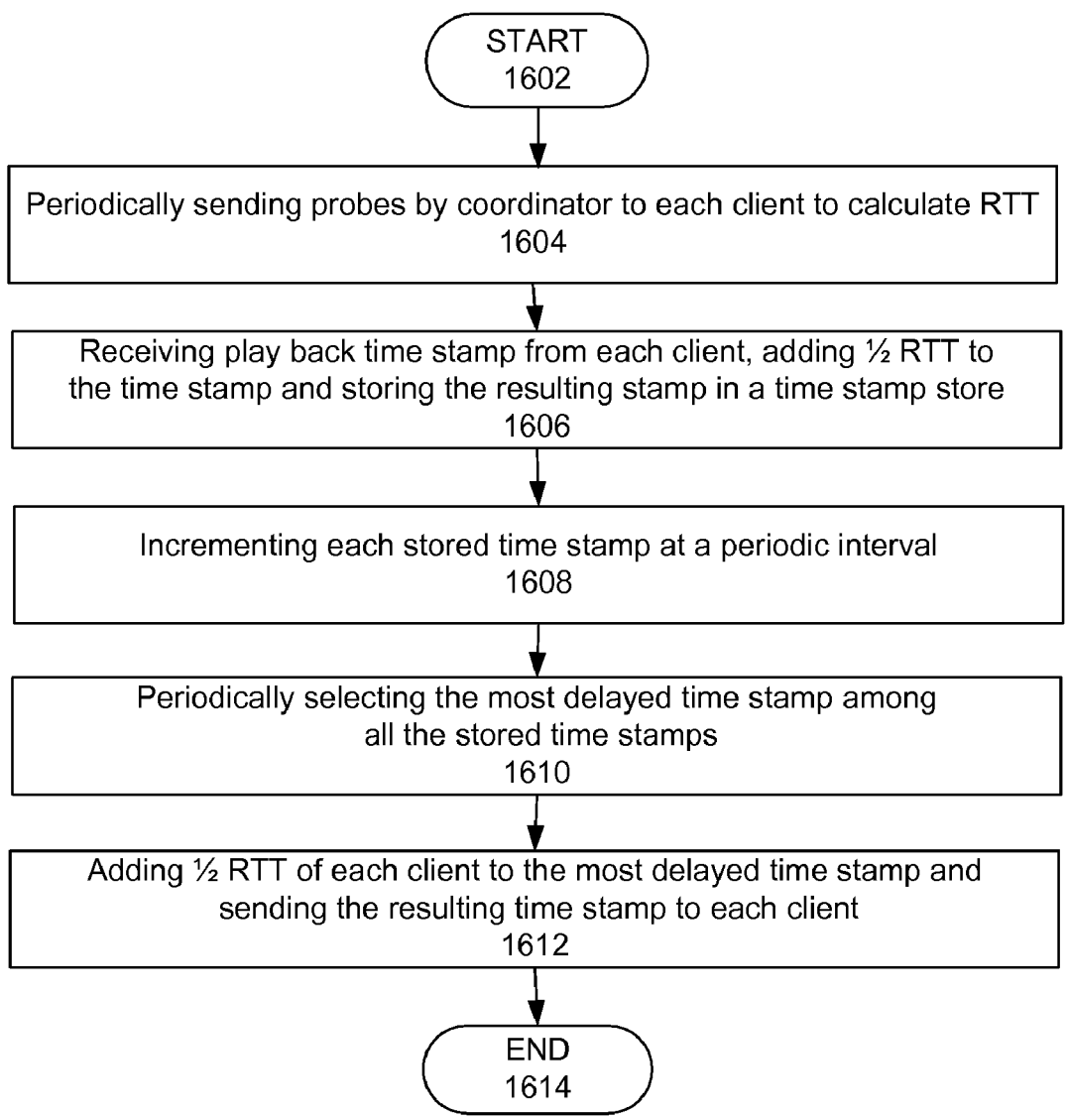
FIG. 16 illustrates a flowchart of a method to operate a video resource daisy-chain access system, in accordance with one embodiment of the invention.

The coordinator 110 sends probes to each client over communication links 120, 122, and 124, respectively, to calculate a Round Trip Time (RTT) that is later used for adjusting the time stamp values. The probes are sent every few seconds and RTT is calculated and stored for each client as running average from the time of when connection got established. Every time the coordinator 110 receives a time stamp from a client over communication link 114, 116, or 118, the coordinator 110 adds half of the RTT, last calculated for that client, to the time stamp. By doing that, the coordinator makes sure that the stored time stamp accurately represents the current playback time stamp of the respective client, assuming that while the time stamp was traveling over a communication link to the coordinator the client continued playing. Once the time stamp is stored, the coordinator 110 keeps incrementing the time stamp (in one embodiment, the incrementing is done every millisecond) using the internal Clock module 300. This is done to keep time stamp in synchronization with the current playback time stamp on the client assuming that the client continues playback. Once in a while (e.g., every few seconds, in one embodiment) the coordinator 110 selects the lowest among all stored time stamps and sends that most delayed time stamp to all clients over communication links 400, 402 and 404, respectively. Before sending the most delayed time stamp to each client the coordinator 110 adds to the value of the most delayed time stamp half of the RTT last calculated for the client it's being sent to. This is done to adjust for the time that it takes for the time stamp value to reach the client over communication link, assuming that the most delayed client continued playing FIG. 16 illustrates a flowchart of a method to operate a video resource daisy-chain access system, in accordance with one embodiment of the invention. The method has to do with keeping track of the playback time stamps received from each client, selecting the most delayed time stamp and updating each client with the most delayed time stamp. The method starts with operation 1602. The operation 1604 is next and includes periodically (once every few seconds) sending probes to each client, calculating RTT for the probe, taking running average of all RTTs previously calculated for that client and storing the calculated RTT. Operation 1606 is next and includes receiving a playback time stamp from client, adding half of the RTT stored for that client to the received time stamp and storing the time stamp in a time stamp store. Operation 1608 is next and includes incrementing each stored time stamp at a periodic interval (e.g., every millisecond, in one embodiment) using the internal clock. Operation 1610 is next and includes periodically (e.g., every few seconds, in one embodiment) selecting the most delayed time stamp among all the stored time stamps. The most delayed time stamp is the smallest time stamp among all the stored time stamps. Operation 1612 is next and includes sending the most delayed time stamp to each client. For each client, before sending the most delayed time stamp, the coordinator adds half of the RTT stored for that client to the most delayed time stamp value. The method ends in operation 1614.

Figure 17:
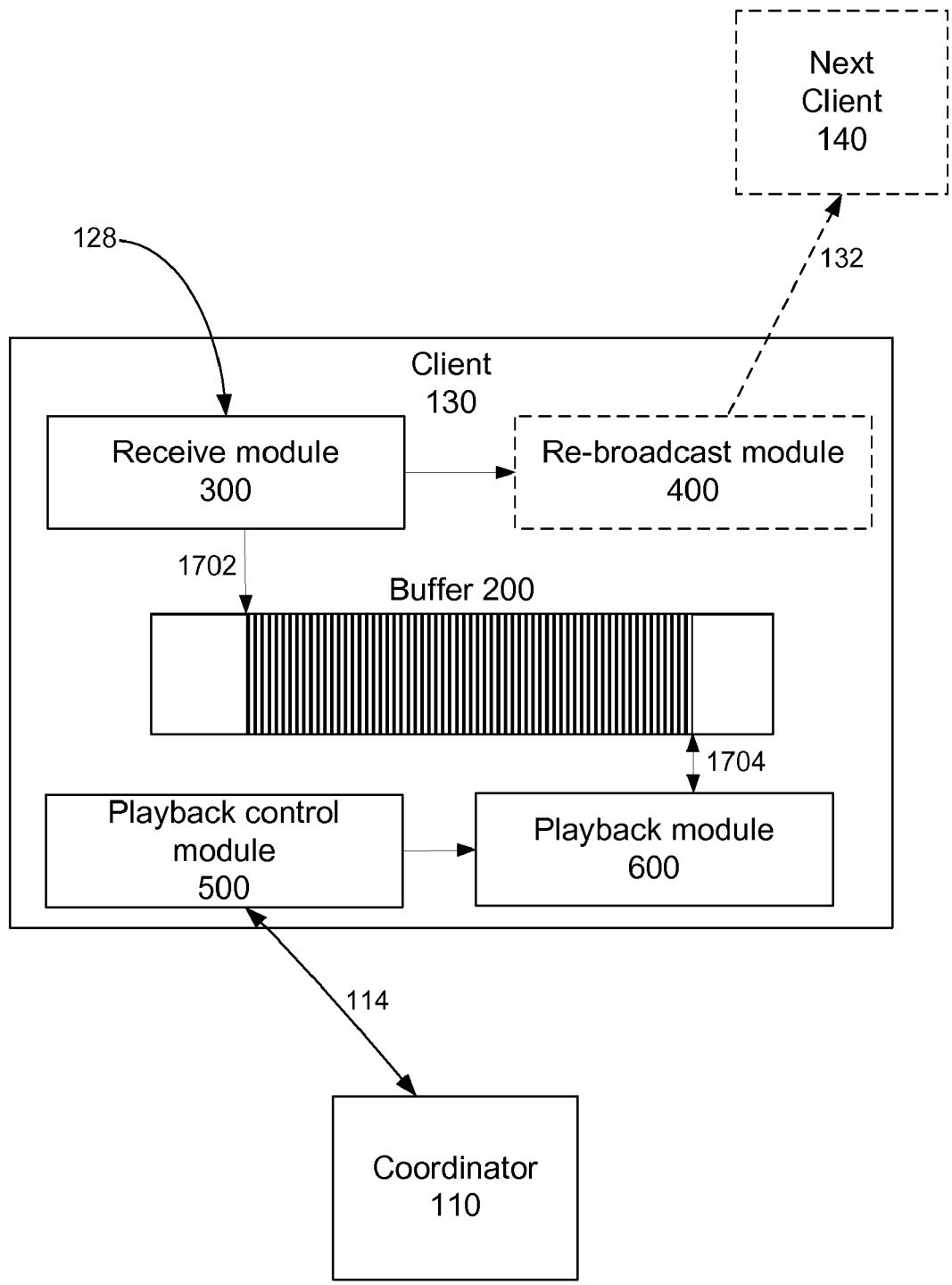
FIG. 17 illustrates a block diagram of a video resource daisy-chain access system, in accordance with one embodiment of the invention.

FIG. 17 illustrates a block diagram of a video resource daisy-chain access system, in accordance with one embodiment of the invention. This block diagram illustrates how a client controls the playback and optionally re-broadcasts the stream to another client. The system includes a client 130, a coordinator 110 and optionally a next client 140 in the daisy chain. The client 130 receives the stream from a broadcasting source or a re-broadcasting client over communication link 128. The client optionally re-broadcasts the received stream to the next client 140 over communication link 132. The client 130 periodically sends the last playback time stamp to the coordinator 110 and receives the most delayed time stamp from the coordinator over a communication link 114. The client 130 consists of the receive module 300, an optional re-broadcast module 400, the buffer 200, the playback module 600 and the playback control module 500. The receive module 300 receives the broadcast stream, stores it in the buffer 200 and optionally sends it to the re-broadcast module 400. The re-broadcast module 400 compares the bit-rate tag on the broadcast stream packet with the effective downlink bandwidth of the next client 140, and sends the re-broadcast stream packet only if the effective downlink bandwidth of the next client 140 is equal or greater than the bit-rate tag. Otherwise the broadcast stream packet is discarded. In one embodiment, the buffer 200 is a circular buffer to store a received broadcast stream if the playback needs to be delayed. The size of the buffer has to be large enough to delay the playback for at least as long as it takes for the broadcast stream to propagate from the broadcast source to the most delayed client. Normally it should range from several seconds to several minutes. In one embodiment, for the worst case (when the playback never started for some reason), the size of the buffer should be as long as the entire duration of the connection session. In a typical application the duration will be no more than two hours. The buffer 200 maintains a write pointer 1702 and a read pointer 1704. The write pointer 1702 is where the receive module 200 stores next received broadcast stream packet. Once the packet is stored, the receive module 200 advances the write pointer 1702. The read pointer 1704 is where the Playback module 600 reads the next packet of the stored broadcast stream for playback. Once the next packet is read, the playback module advances the read pointer 1704. The playback module 600 plays back the broadcast stream stored in the buffer 200 on the client 130. Playback module 600 responds to control signals from playback control module 500 to pause or start/resume playback. The playback control module 500 compares the most delayed time stamp periodically received from the coordinator 110 with the last playback time stamp obtained from the playback module 600 and controls the playback based on the results of the comparison. If the most delayed time stamp is less than the playback time stamp (by some essential amount which in one embodiment of the invention is one second), it sends a control signal to playback module 600 to pause the playback. If the most delayed time stamp is essentially equal to the last playback time stamp (in one embodiment this would mean the most delayed time stamp and the last playback time stamp being different by no more than one second) the playback control module 500 will send a control signal to the playback module 600 to start the playback, and the playback module 600 will start or resume the playback if it was not already playing at the time.

Figure 18:
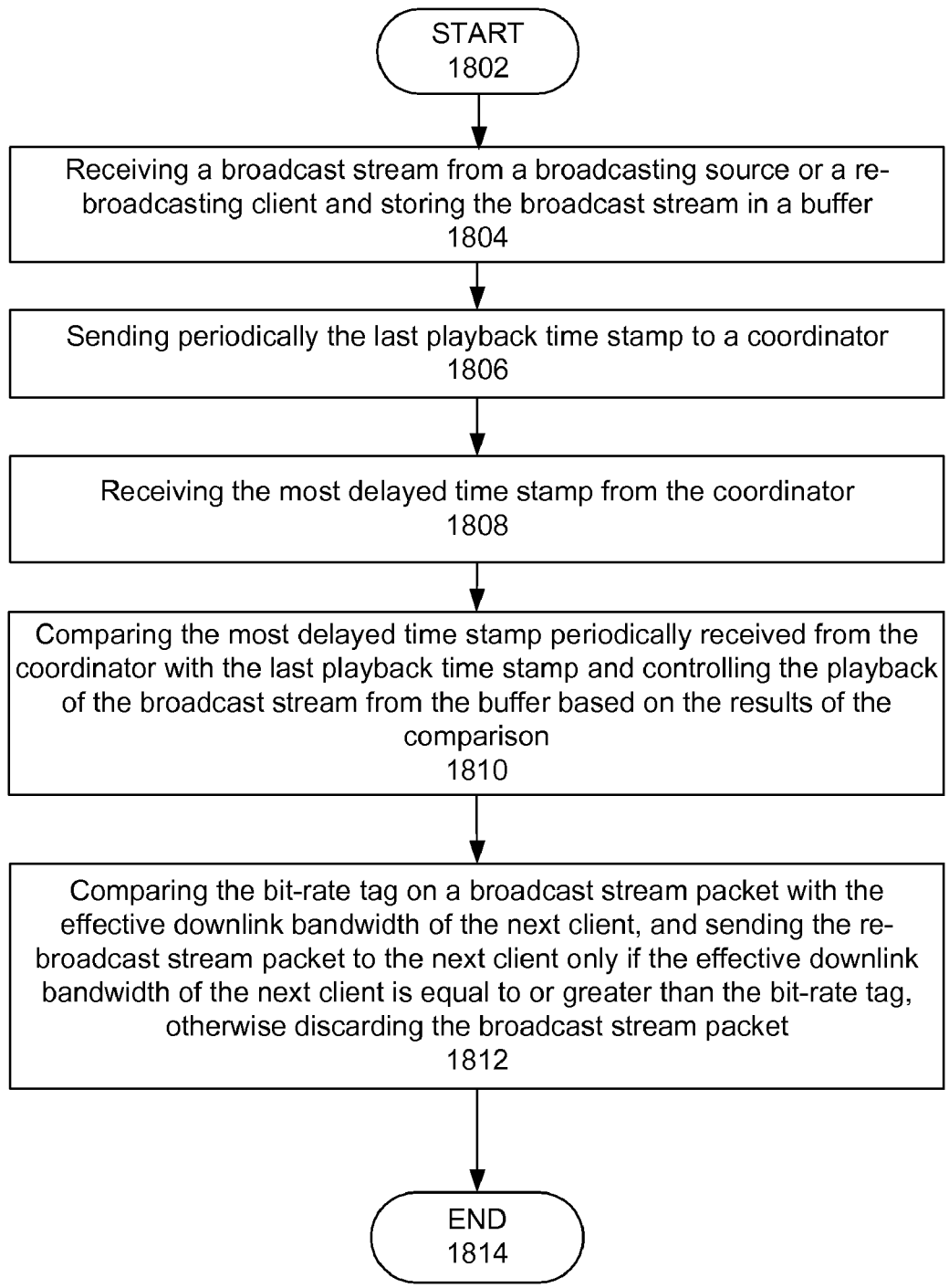
FIG. 18 illustrates a flowchart of a method to operate a video resource daisy-chain access system, in accordance with one embodiment of the invention.

FIG. 18 illustrates a flowchart of a method to operate a video resource daisy-chain access system, in accordance with one embodiment of the invention. The method illustrates how a client controls the playback and optionally re-broadcasts the stream to another client. The method starts with operation 1802. The operation 1804 is next and includes receiving a broadcast stream from a broadcasting source or a re-broadcasting client and storing the broadcast stream in a buffer. Operation 1806 is next and includes sending periodically the last playback time stamp to a coordinator. Operation 1808 is next and includes receiving the most delayed time stamp from the coordinator. Operation 1810 is next and includes comparing the most delayed time stamp periodically received from the coordinator with the last playback time stamp and controlling the playback of the broadcast stream from the buffer based on the results of the comparison. Operation 1812 is next and includes comparing the bit-rate tag on a broadcast stream packet with the effective downlink bandwidth of the next client, and sending the re-broadcasting stream packet to the next client only if the effective downlink bandwidth of the next client is equal to or greater than the bit-rate tag, otherwise discarding the broadcast stream packet. The method ends in operation 1814.

For the purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to include, but not be limited to, solid-state memories, optical and magnetic disks, and carrier wave signals.

Several embodiments of the invention are possible. The exemplary embodiments described herein are for purposes of illustration and are not intended to be limiting. Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Therefore, those skilled in the art will recognize that other embodiments could be practiced without departing from the scope and spirit of the claims set forth below.

What is claimed is:

1. A method to operate a video resource daisy-chain access system, comprising:
   requesting from a coordinator access instructions for a client to receive a broadcast stream from a broadcast source;
   connecting to the broadcast source, or connecting to a re-broadcasting client already receiving the broadcast stream, as instructed by the coordinator;
   playing back on the client the received broadcast stream;
   periodically sending to the coordinator the last played back time stamp of the received broadcast stream;
   periodically receiving at a client, from the coordinator, the time stamp of the most delayed client received by the coordinator from all clients;
   receiving a playback time stamp from the one or more clients, and adding half of the round trip time to the time stamp and storing the time stamp in a time stamp store;
   incrementing each stored time stamp at a periodic interval;
   periodically selecting the most delayed time stamp among all the stored time stamps;
   adding half of the round trip time of the one or more clients to the most delayed time stamp and sending the resulting time stamp to the one or more clients; and
   testing to determine if the difference between the most delayed time stamp and the last played back time stamp of the received broadcast stream is bigger than an acceptable threshold, wherein
      if the difference of the test is not bigger than the acceptable threshold, then no playback adjustment is made to the received broadcast stream,
      if the difference of the test is bigger than the acceptable threshold, then pausing playback of the received broadcast stream of the client until the time stamp of the most delayed client is within the acceptable threshold.

2. The method of claim 1, further comprising:
   registering with the coordinator as a potential re-broadcasting client for broadcasting to one or more new clients; and
   accepting connection requests from one or more new clients for re-broadcasting of the received broadcast stream.

3. The method of claim 1, further comprising:
   sending information to the coordinator concerning the effective downlink bandwidth for one or more clients; and
   adjusting the data compression bit-rate of a re-broadcasting client to accommodate the slowest downlink bandwidth of a client of the one or more clients.

4. The method of claim 1, further comprising:
   detecting the unavailability of a re-broadcasting client needed by at least one client; and
   sending reconnecting information to the at least one client to receive a broadcast stream from another re-broadcasting client or the broadcast source.

5. A method to operate a video resource daisy-chain access system, comprising:
   requesting from a coordinator access instructions for a client to receive a broadcast stream from a broadcast source;
   connecting to the broadcast source, or connecting to a re-broadcasting client already receiving the broadcast stream, as instructed by the coordinator;
   playing back on the client the received broadcast stream;
   periodically sending one or more probes by the coordinator to one or more clients to calculate a round trip time;
   receiving a playback time stamp from the one or more clients, and adding half of the round trip time to the time stamp and storing the time stamp in a time stamp store;
   incrementing each stored time stamp at a periodic interval;
   periodically selecting the most delayed time stamp among all the stored time stamps;
   adding half of the round trip time of the one or more clients to the most delayed time stamp and sending the resulting time stamp to the one or more clients; and
   testing to determine if the difference between the most delayed time stamp and the last played back time stamp of the received broadcast stream is bigger than an acceptable threshold, wherein
      if the difference of the test is not bigger than the acceptable threshold, and if the playback of the received broadcast stream hasn't started yet or was paused, then playback of the received broadcast stream is started or resumed,
      if the difference of the test is not bigger than the acceptable threshold and the playback of the received broadcast stream was in progress, then no playback adjustment is made to the received broadcast stream, or
      if the difference of the test is bigger than the acceptable threshold, then pausing playback of the received broadcast stream of the client until the time stamp of the most delayed client is within the acceptable threshold.

6. A method to operate a video resource daisy-chain access system, comprising:
   requesting from a coordinator access instructions for a client to receive a broadcast stream from a broadcast source;
   connecting the client to the broadcast source, or a re-broadcasting client already receiving the broadcast stream, as instructed by the coordinator;
   playing back on the client the received broadcast stream;
   periodically sending to the coordinator the last played back time stamp of the received broadcast stream;
   periodically receiving at a client, from the coordinator, the time stamp of the most delayed client received by the coordinator from all clients; and
   testing to determine if the difference between the most delayed time stamp and the last played back time stamp of the received broadcast stream is bigger than an acceptable threshold, wherein if the difference of the test is not bigger than the acceptable threshold, then no playback adjustment is made to the received broadcast stream, if the difference of the test is bigger than the acceptable threshold, then pausing playback of the received broadcast stream of the client until the time stamp of the most delayed client is within the acceptable threshold.

7. The method of claim 6, further comprising:
periodically sending one or more probes by the coordinator to one or more clients to calculate a round trip time;
receiving a playback time stamp from the one or more clients, and half of the round trip time to the time stamp and storing the time stamp in a time stamp store;
incrementing each stored time stamp at a periodic interval;
periodically selecting the most delayed time stamp among all the stored time stamps; and
adding half of the round trip time of the one or more clients to the most delayed time stamp and sending the resulting time stamp to the one or more clients.

8. The method of claim 6 wherein the operation of registering with the coordinator as a potential re-broadcasting client for new clients includes announcing an available uplink bandwidth to the coordinator for a future reference.

9. The method of claim 6, further comprising:
registering with the coordinator as a potential re-broadcasting client for new clients; and
accepting connection requests from new clients for re-broadcasting of the received broadcast stream.

10. The method of claim 6, further comprising:
sending information to the coordinator concerning the effective downlink bandwidth for at least one client; and
adjusting the data compression bit-rate of a re-broadcasting client to accommodate the slowest downlink bandwidth to a plurality of clients.

11. The method of claim 6, further comprising:
detecting the unavailability of a re-broadcasting client needed by at least one client; and
sending reconnecting information to the at least one client to receive a broadcast stream from another re-broadcasting client or the broadcast source.

12. The method of claim 6 wherein adjusting the playback of a client includes adjusting the playback of a broadcast stream from a buffer in the client.

13. The method of claim 6 wherein adjusting the playback of a client includes changing the re-broadcasting client for the client to a second re-broadcasting client or the broadcast source.

14. A video resource daisy-chain access system, comprising:
a coordinator for organizing a daisy-chain video resource access system and synchronizing video playback between the clients;
a broadcasting source having a communication link with the coordinator;
a first client having a communication link with the coordinator and a communication link with the broadcasting source;
a second client having a communication link with the coordinator and a communication link with the first client;
means for periodically sending one or more probes by the coordinator to one or more clients to calculate a round trip time;
means for receiving a playback time stamp from the one or more clients, and adding half of the round trip time to the time stamp and storing the time stamp in a time stamp store;

means for incrementing each stored time stamp at a periodic interval;
means for periodically selecting the most delayed time stamp among all the stored time stamps;
means for adding half of the round trip time of the one or more clients to the most delayed time stamp and sending the resulting time stamp to the one or more clients; and
means for testing to determine if the difference between the most delayed time stamp and the last played back time stamp of the received broadcast stream is bigger than an acceptable threshold, wherein
if the difference of the test is not bigger than the acceptable threshold, then no playback adjustment is made to the received broadcast stream,
if the difference of the test is bigger than the acceptable threshold, then pausing playback of the received broadcast stream of the client until the time stamp of the most delayed client is within the acceptable threshold.

15. The system of claim 14, further comprising:
a third client having a communication link with the coordinator and a communication link with the second client.

16. The system of claim 14, further comprising:
a module in a client to register with the coordinator as a potential re-broadcasting client for new clients; and
a module in the client to accept connection requests from one or more new clients for re-broadcasting of the received broadcast stream.

17. The system of claim 14, further comprising:
a module in a client to send information to the coordinator concerning the effective downlink bandwidth for the client; and
a module in a re-broadcasting client to adjust the data compression bit-rate of the re-broadcasting client to accommodate the slowest downlink bandwidth to a plurality of clients.

18. The system of claim 14, further comprising:
a module in the coordinator to detect the unavailability of a re-broadcasting client needed by at least one client; and
a module in the coordinator to send reconnecting information to the at least one client to receive a broadcast stream from another re-broadcasting client or the broadcast source.

19. A video resource daisy-chain access system, comprising:
a coordinator for organizing a daisy-chain video resource access system and synchronizing video playback between the clients;
a broadcasting source having a communication link with the coordinator;
a first client having a communication link with the coordinator and a communication link with the broadcasting source;
a second client having a communication link with the coordinator and a communication link with the first client;
a module to periodically send one or more probes by the coordinator to one or more clients to calculate a round trip time;
a module to receive a playback time stamp from the one or more clients, and add half of the round trip time to the time stamp and store the time stamp in a time stamp store;
means for incrementing each stored time stamp at a periodic interval;
means for periodically selecting the most delayed time stamp among all the stored time stamps;

means for adding half of the round trip time of the one or more clients to the most delayed time stamp and sending the resulting time stamp to the one or more clients; and means for testing to determine if the difference between the most delayed time stamp and the last played back time stamp of the received broadcast stream is bigger than an acceptable threshold, wherein if the difference of the test is not bigger than the acceptable threshold, and if the playback of the received broadcast stream hasn't started yet or was paused, then playback of the received broadcast stream is started or resumed, if the difference of the test is not bigger than the acceptable threshold and the playback of the received broadcast stream was in progress, then no playback adjustment is made to the received broadcast stream, or if the difference of the test is bigger than the acceptable threshold, then pausing playback of the received broadcast stream of the client until the time stamp of the most delayed client is within the acceptable threshold.

* * * * *